(12) United States Patent
Inoue et al.

(10) Patent No.: US 8,891,493 B2
(45) Date of Patent: Nov. 18, 2014

(54) METHOD AND DEVICE FOR ASSIGNING REFERENCE SIGNAL SEQUENCES IN MOBILE COMMUNICATIONS SYSTEM

(75) Inventors: Takamichi Inoue, Tokyo (JP); Yoshikazu Kakura, Tokyo (JP)

(73) Assignee: NEC Corporation, Tokyo (JP)

( * ) Notice: Subject to any disclaimer, the term of this patent is extended or adjusted under 35 U.S.C. 154(b) by 1828 days.

(21) Appl. No.: 12/141,748

(22) Filed: Jun. 18, 2008

(65) Prior Publication Data

US 2008/0318608 A1   Dec. 25, 2008

(30) Foreign Application Priority Data

Jun. 19, 2007   (JP) ................................. 2007-161959

(51) Int. Cl.
*H04B 3/16*          (2006.01)
*H04L 27/26*         (2006.01)
*H04W 16/02*         (2009.01)
*H04J 13/16*         (2011.01)
*H04L 5/00*          (2006.01)
*H04J 13/18*         (2011.01)
*H04B 1/707*         (2011.01)
*H04J 13/00*         (2011.01)

(52) U.S. Cl.
CPC .......... *H04B 1/707* (2013.01); *H04L 27/2613* (2013.01); *H04W 16/02* (2013.01); *H04B 2201/70701* (2013.01); *H04J 13/16* (2013.01); *H04L 5/0048* (2013.01); *H04J 13/0003* (2013.01); *H04J 13/18* (2013.01); *H04L 5/0023* (2013.01); *H04J 13/0059* (2013.01)
USPC ........................................ 370/335; 370/468

(58) Field of Classification Search
CPC ................................................. H04W 72/0453
USPC ................ 370/328–331, 335, 342, 441, 468; 455/436, 442, 443, 524, 525, 446, 447, 455/449, 451
See application file for complete search history.

(56) References Cited

U.S. PATENT DOCUMENTS

| | | | | |
|---|---|---|---|---|
| 8,036,197 | B2 * | 10/2011 | Pajukoski et al. | 370/342 |
| 8,165,159 | B2 * | 4/2012 | Oketani et al. | 370/468 |
| 2007/0183386 | A1 * | 8/2007 | Muharemovic et al. | 370/344 |
| 2007/0253465 | A1 * | 11/2007 | Muharemovic et al. | 375/130 |
| 2008/0268857 | A1 * | 10/2008 | McCoy et al. | 455/447 |
| 2012/0269159 | A1 * | 10/2012 | Inoue et al. | 370/329 |

OTHER PUBLICATIONS

Popovic, B. M., "Generalized Chirp-Like Polyphase Sequences with Optimum Correlation Properties," IEEE Transactions on Information Theory (Jul. 1992), vol. 38, No. 4, pp. 1406-1409.
3GPP R1-060925, Texas Instruments, "Comparison of Proposed Uplink Pilot Structures for SC-OFDMA," Mar. 2006.
3GPP R1-071294, Qualcomm Europe, "Link Analysis and Multiplexing Capability for CQI Transmission," Mar. 2007.

(Continued)

*Primary Examiner* — Hanh N Nguyen
(74) *Attorney, Agent, or Firm* — Scully, Scott, Murphy & Presser, P.C.

(57) ABSTRACT

A reference signal sequence assignment method and device are provided by which the influence of inter-cell interference can be reduced and the number of usable cyclic shifted sequences per sector can be increased. In a mobile communications system with a structure including multiple cells each including multiple sectors, a sequence assignment method is employed by which pseudo-orthogonal sequences used for reference signals are assigned to cells or sectors. According to this method, the multiple pseudo-orthogonal sequences are assigned to cells or sectors by using multiple repetition patterns.

26 Claims, 18 Drawing Sheets

(56) References Cited

OTHER PUBLICATIONS

3GPP R1-071293, Qualcomm Europe, "Link Analysis and Multiplexing Capability for UL ACK" Mar. 2007.
3GPP R1-070782, Motorola, "Multiplexing of UL L1/L2 control signals in the absence of data," Feb. 2007.
3GPP R1-072429, NTT DoCoMo, Fujitsu, Mitsubishi Electric, NEC, Panasonic, Sharp, and Toshiba Corporation, "Necessity of Multiple Bandwidths for Sounding Reference Signals," May 2007.
3GPP R1-070367, Huawei, "Sequence Allocation Method for E-UTRA Uplink Reference Signal," Jan. 2007.
3GPP R1-072467, Ericsson, "Uplink reference-signal (DM) structure," May 2007.
3GPP TSG-RAN WG1 LTE adhoc, Cannes, France, Lucent Technologies, "Precoded FDM Reference Signals for SC-FDMA", Jun. 2006, vol. R1-061876.
TSG-RAN WG1 Meeting #47, Riga, Latvia, Panasonic, NTT DoCoMo, "Narrow band uplink reference signal sequences and allocation for E-UTRA", Nov. 2006, vol. R1-063183.
3GPP TSG RAN WG1#44, Denver, USA, Fujitsu, "Considerations on CAZAC Reference-Signal for E-UTRA Uplink", Feb. 2006, vol. R1-060564.
3GPP TSG RAN WG1#44 bis, Athens, Greece, Fujitsu, "Considerations on CAZAC Reference-Signal for E-UTRA Uplink", Mar. 2006, vol. R1-060971.
3GPP TSG RAN WG1 Meeting #46bis, Seoul, Korea, NTT DoCoMo, Fujitsu, KDDI, Mitsubishi Electric, NEC, Panasonic, Sharp, Toshiba Corporation, "Reference Signal Structure in E-UTRA Downlink", Oct. 2006, vol. R1-062724.
3GPP TSG RAN WG1 Meeting #46bis, Seoul, Korea, NTT DoCoMo, Fujitsu, KDDI, LG Electronics, Mitsubishi Electric, NEC, Panasonic, Sharp, Toshiba Corporation, Multiplexing Method for Orthogonal Reference Signals E-UTRA Uplink, Oct. 2006, vol. R1-062726.
3GPP TSG RAN WG1 Meeting #47, Riga, Latvia, NTT DoCoMo, LG Electronics, Mitsubishi Electric, Panasonic, Sharp, Toshiba Corporation, "Reference Signal Sequence Allocation Method in E-UTRA Uplink", Nov. 2006, vol. R1-063309.
3GPP TSG RAN WG1 Meeting #46, Tallinn, Estonia, Motorola "EUTRA SC-FDMA Uplink Pilot/Reference Signal Design & TP", Sep. 2006, vol. R1-062073.
3GPP TSG RAN WG1 Meeting #49bis, Orlando, FL, Panasonic, "Further consideration on uplink RS hopping and grouping", Jun. 2007, vol. R1-072804.
3GPP TSG RAN WG1 Meeting #46bis, Seoul, Korea, NTT DoCoMo, Mitsubishi Electric, Panasonic, Sharp, Toshiba Corporation, "Reference Signal Sequence Allocation Method in E-UTRA Uplink", Oct. 2006, vol. R1-062728.
Office Action dated Feb. 23, 2012 received from the Japanese Patent Office from related Japanese Application No. 2007-161959, together with an English-language translation.

* cited by examiner

SOUNDING RS SEQUENCE GROUP

PUSCH/PUCCH DM RS SEQUENCE GROUP

FIG. 6

| GROUP | 1 RESOURCE BLOCK (11) | 2 RESOURCE BLOCKS (23) | 3 RESOURCE BLOCKS (31) | |
|---|---|---|---|---|
| $G_1$ | $C_{1,1}$ | $C_{2,1}, C_{2,2}$ | $C_{3,1}, C_{3,2}, C_{3,3}$ | ...... |
| $G_2$ | $C_{1,2}$ | $C_{2,3}, C_{2,4}$ | $C_{3,4}, C_{3,5}, C_{3,6}$ | ...... |
| $G_3$ | $C_{1,3}$ | $C_{2,5}, C_{2,6}$ | $C_{3,7}, C_{3,8}, C_{3,9}$ | ...... |
| $G_4$ | $C_{1,4}$ | $C_{2,7}, C_{2,8}$ | $C_{3,10}, C_{3,11}, C_{3,12}$ | ...... |
| $G_5$ | $C_{1,5}$ | $C_{2,9}, C_{2,10}$ | $C_{3,13}, C_{3,14}, C_{3,15}$ | ...... |
| $G_6$ | $C_{1,6}$ | $C_{2,11}, C_{2,12}$ | $C_{3,16}, C_{3,17}, C_{3,18}$ | ...... |
| $G_7$ | $C_{1,7}$ | $C_{2,13}, C_{2,14}$ | $C_{3,19}, C_{3,20}, C_{3,21}$ | ...... |
| $G_8$ | $C_{1,8}$ | $C_{2,15}, C_{2,16}$ | $C_{3,22}, C_{3,23}, C_{3,24}$ | ...... |
| $G_9$ | $C_{1,9}$ | $C_{2,17}, C_{2,18}$ | $C_{3,25}, C_{3,26}, C_{3,27}$ | ...... |

FIG. 7

| CELL INDEX | 1 | | | | | 2 | | | | | 3 | | | | | 4 | | | | | 5 | | | |
|---|---|---|---|---|---|---|---|---|---|---|---|---|---|---|---|---|---|---|---|---|---|---|---|---|
| SECTOR INDEX | 1 | 2 | 3 | | | 1 | 2 | 3 | | | 1 | 2 | 3 | | | 1 | 2 | 3 | | | 1 | 2 | 3 | |
| PUSCH DEMOD RS SEQUENCE | $S_{1,4}$ | $G_1$ $S_{2,5}$ | $S_{3,6}$ | | | $S_{1,4}$ | $G_2$ $S_{2,5}$ | $S_{3,6}$ | | | $S_{1,4}$ | $G_3$ $S_{2,5}$ | $S_{3,6}$ | | | $S_{1,4}$ | $G_4$ $S_{2,5}$ | $S_{3,6}$ | | | $S_{1,4}$ | $G_5$ $S_{2,5}$ | $S_{3,6}$ | |
| PUCCH DEMOD RS SEQUENCE | $S_{1,4}$ | $G_1$ $S_{2,5}$ | $S_{3,6}$ | | | $S_{1,4}$ | $G_2$ $S_{2,5}$ | $S_{3,6}$ | | | $S_{1,4}$ | $G_3$ $S_{2,5}$ | $S_{3,6}$ | | | $S_{1,4}$ | $G_4$ $S_{2,5}$ | $S_{3,6}$ | | | $S_{1,4}$ | $G_5$ $S_{2,5}$ | $S_{3,6}$ | |
| SOUNDING RS SEQUENCE | $G_1$ $S_{1-6}$ | $G_4$ $S_{1-6}$ | $G_7$ $S_{1-6}$ | | | $G_2$ $S_{1-6}$ | $G_5$ $S_{1-6}$ | $G_8$ $S_{1-6}$ | | | $G_3$ $S_{1-6}$ | $G_6$ $S_{1-6}$ | $G_9$ $S_{1-6}$ | | | $G_1$ $S_{1-6}$ | $G_4$ $S_{1-6}$ | $G_7$ $S_{1-6}$ | | | $G_2$ $S_{1-6}$ | $G_5$ $S_{1-6}$ | $G_8$ $S_{1-6}$ | |
| SEQUENCE NOTIFICATION NO. | 1 | 4 | 7 | | | 2 | 5 | 8 | | | 3 | 6 | 9 | | | 10 | 13 | 16 | | | 11 | 14 | 17 | |

| CELL INDEX | 6 | | | 7 | | | 8 | | | 9 | | |
|---|---|---|---|---|---|---|---|---|---|---|---|---|
| SECTOR INDEX | 1 | 2 | 3 | 1 | 2 | 3 | 1 | 2 | 3 | 1 | 2 | 3 |
| PUSCH DEMOD RS SEQUENCE | $S_{1,4}$ $G_6$ $S_{2,5}$ $S_{3,6}$ | | | $S_{1,4}$ $G_7$ $S_{2,5}$ $S_{3,6}$ | | | $S_{1,4}$ $G_8$ $S_{2,5}$ $S_{3,6}$ | | | $S_{1,4}$ $G_9$ $S_{2,5}$ $S_{3,6}$ | | |
| PUCCH DEMOD RS SEQUENCE | $S_{1,4}$ $G_6$ $S_{2,5}$ $S_{3,6}$ | | | $S_{1,4}$ $G_7$ $S_{2,5}$ $S_{3,6}$ | | | $S_{1,4}$ $G_8$ $S_{2,5}$ $S_{3,6}$ | | | $S_{1,4}$ $G_9$ $S_{2,5}$ $S_{3,6}$ | | |
| SOUNDING RS SEQUENCE | $G_3$ $S_{1-6}$ | $G_6$ $S_{1-6}$ | $G_9$ $S_{1-6}$ | $G_1$ $S_{1-6}$ | $G_4$ $S_{1-6}$ | $G_7$ $S_{1-6}$ | $G_2$ $S_{1-6}$ | $G_5$ $S_{1-6}$ | $G_8$ $S_{1-6}$ | $G_3$ $S_{1-6}$ | $G_6$ $S_{1-6}$ | $G_9$ $S_{1-6}$ |
| SEQUENCE NOTIFICATION NO. | 12 | 15 | 18 | 19 | 22 | 25 | 20 | 23 | 26 | 21 | 24 | 27 |

SOUNDING RS SEQUENCE
(SEQUENCE LENGTH=36)

PUSCH/PUCCH DM RS SEQUENCE
(SEQUENCE LENGTH=12)

FIG. 9

| CELL INDEX | 1 | | | 2 | | | 3 | | | 4 | | | 5 | | |
|---|---|---|---|---|---|---|---|---|---|---|---|---|---|---|---|
| SECTOR INDEX | 1 | 2 | 3 | 1 | 2 | 3 | 1 | 2 | 3 | 1 | 2 | 3 | 1 | 2 | 3 |
| PUSCH DEMOD. RS SEQUENCE | $C_{1,1}$ | | | $C_{1,2}$ | | | $C_{1,3}$ | | | $C_{1,4}$ | | | $C_{1,5}$ | | |
| | $S_{1,4}$ | $S_{2,5}$ | $S_{3,6}$ | $S_{1,4}$ | $S_{2,5}$ | $S_{3,6}$ | $S_{1,4}$ | $S_{2,5}$ | $S_{3,6}$ | $S_{1,4}$ | $S_{2,5}$ | $S_{3,6}$ | $S_{1,4}$ | $S_{2,5}$ | $S_{3,6}$ |
| PUCCH DEMOD. RS SEQUENCE | $C_{1,1}$ | | | $C_{1,2}$ | | | $C_{1,3}$ | | | $C_{1,4}$ | | | $C_{1,5}$ | | |
| | $S_{1,4}$ | $S_{2,5}$ | $S_{3,6}$ | $S_{1,4}$ | $S_{2,5}$ | $S_{3,6}$ | $S_{1,4}$ | $S_{2,5}$ | $S_{3,6}$ | $S_{1,4}$ | $S_{2,5}$ | $S_{3,6}$ | $S_{1,4}$ | $S_{2,5}$ | $S_{3,6}$ |
| SOUNDING RS SEQUENCE | $C_{3,1}$ $S_{1-6}$ | $C_{3,4}$ $S_{1-6}$ | $C_{3,7}$ $S_{1-6}$ | $C_{3,2}$ $S_{1-6}$ | $C_{3,5}$ $S_{1-6}$ | $C_{3,8}$ $S_{1-6}$ | $C_{3,3}$ $S_{1-6}$ | $C_{3,6}$ $S_{1-6}$ | $C_{3,9}$ $S_{1-6}$ | $C_{3,10}$ $S_{1-6}$ | $C_{3,13}$ $S_{1-6}$ | $C_{3,16}$ $S_{1-6}$ | $C_{3,11}$ $S_{1-6}$ | $C_{3,14}$ $S_{1-6}$ | $C_{3,17}$ $S_{1-6}$ |
| SEQUENCE NOTIFICATION NO. | 1 | 4 | 7 | 2 | 5 | 8 | 3 | 6 | 9 | 10 | 13 | 16 | 11 | 14 | 17 |

| CELL INDEX | 6 | | | 7 | | | 8 | | | 9 | | |
|---|---|---|---|---|---|---|---|---|---|---|---|---|
| SECTOR INDEX | 1 | 2 | 3 | 1 | 2 | 3 | 1 | 2 | 3 | 1 | 2 | 3 |
| PUSCH DEMOD. RS SEQUENCE | $C_{1,6}$ | | | $C_{1,7}$ | | | $C_{1,8}$ | | | $C_{1,9}$ | | |
| | $S_{1,4}$ | $S_{2,5}$ | $S_{3,6}$ | $S_{1,4}$ | $S_{2,5}$ | $S_{3,6}$ | $S_{1,4}$ | $S_{2,5}$ | $S_{3,6}$ | $S_{1,4}$ | $S_{2,5}$ | $S_{3,6}$ |
| PUCCH DEMOD. RS SEQUENCE | $C_{1,6}$ | | | $C_{1,7}$ | | | $C_{1,8}$ | | | $C_{1,9}$ | | |
| | $S_{1,4}$ | $S_{2,5}$ | $S_{3,6}$ | $S_{1,4}$ | $S_{2,5}$ | $S_{3,6}$ | $S_{1,4}$ | $S_{2,5}$ | $S_{3,6}$ | $S_{1,4}$ | $S_{2,5}$ | $S_{3,6}$ |
| SOUNDING RS SEQUENCE | $C_{3,12}$ $S_{1-6}$ | $C_{3,15}$ $S_{1-6}$ | $C_{3,18}$ $S_{1-6}$ | $C_{3,19}$ $S_{1-6}$ | $C_{3,22}$ $S_{1-6}$ | $C_{3,25}$ $S_{1-6}$ | $C_{3,20}$ $S_{1-6}$ | $C_{3,23}$ $S_{1-6}$ | $C_{3,26}$ $S_{1-6}$ | $C_{3,21}$ $S_{1-6}$ | $C_{3,24}$ $S_{1-6}$ | $C_{3,27}$ $S_{1-6}$ |
| SEQUENCE NOTIFICATION NO. | 12 | 15 | 18 | 19 | 22 | 25 | 20 | 23 | 26 | 21 | 24 | 27 |

SOUNDING RS SEQUENCE GROUP

PUSCH/PUCCH DM RS SEQUENCE GROUP

FIG. 11

| CELL INDEX | 1 | | | 2 | | | 3 | | | 4 | | | 5 | | |
|---|---|---|---|---|---|---|---|---|---|---|---|---|---|---|---|
| SECTOR INDEX | 1 | 2 | 3 | 1 | 2 | 3 | 1 | 2 | 3 | 1 | 2 | 3 | 1 | 2 | 3 |
| PUSCH DEMOD. RS SEQUENCE | $S_{1,4}$ | $G_1$ $S_{2,5}$ | $S_{3,6}$ | $S_{1,4}$ | $G_2$ $S_{2,5}$ | $S_{3,6}$ | $S_{1,4}$ | $G_3$ $S_{2,5}$ | $S_{3,6}$ | $S_{1,4}$ | $G_4$ $S_{2,5}$ | $S_{3,6}$ | $S_{1,4}$ | $G_5$ $S_{2,5}$ | $S_{3,6}$ |
| PUCCH DEMOD. RS SEQUENCE | | $G_1$ $S_{2,5}$ | $S_{3,6}$ | $S_{1,4}$ | $G_2$ $S_{2,5}$ | $S_{3,6}$ | $S_{1,4}$ | $G_3$ $S_{2,5}$ | $S_{3,6}$ | $S_{1,4}$ | $G_4$ $S_{2,5}$ | $S_{3,6}$ | $S_{1,4}$ | $G_5$ $S_{2,5}$ | $S_{3,6}$ |
| SOUNDING RS SEQUENCE | $C_{3,1}$ $S_{1-6}$ | $C_{3,2}$ $S_{1-6}$ | $C_{3,3}$ $S_{1-6}$ | $C_{3,4}$ $S_{1-6}$ | $C_{3,5}$ $S_{1-6}$ | $C_{3,6}$ $S_{1-6}$ | $C_{3,7}$ $S_{1-6}$ | $C_{3,8}$ $S_{1-6}$ | $C_{3,9}$ $S_{1-6}$ | $C_{3,10}$ $S_{1-6}$ | $C_{3,11}$ $S_{1-6}$ | $C_{3,12}$ $S_{1-6}$ | $C_{3,13}$ $S_{1-6}$ | $C_{3,14}$ $S_{1-6}$ | $C_{3,15}$ $S_{1-6}$ |
| SEQUENCE NOTIFICATION NO. | 1 | 4 | 7 | 2 | 5 | 8 | 3 | 6 | 9 | 10 | 13 | 16 | 11 | 14 | 17 |

| CELL INDEX | 6 | | | 7 | | | 8 | | | 9 | | |
|---|---|---|---|---|---|---|---|---|---|---|---|---|
| SECTOR INDEX | 1 | 2 | 3 | 1 | 2 | 3 | 1 | 2 | 3 | 1 | 2 | 3 |
| PUSCH DEMOD. RS SEQUENCE | $S_{1,4}$ | $G_6$ $S_{2,5}$ | $S_{3,6}$ | $S_{1,4}$ | $G_7$ $S_{2,5}$ | $S_{3,6}$ | $S_{1,4}$ | $G_8$ $S_{2,5}$ | $S_{3,6}$ | $S_{1,4}$ | $G_9$ $S_{2,5}$ | $S_{3,6}$ |
| PUCCH DEMOD. RS SEQUENCE | $S_{1,4}$ | $G_6$ $S_{2,5}$ | $S_{3,6}$ | $S_{1,4}$ | $G_7$ $S_{2,5}$ | $S_{3,6}$ | $S_{1,4}$ | $G_8$ $S_{2,5}$ | $S_{3,6}$ | $S_{1,4}$ | $G_9$ $S_{2,5}$ | $S_{3,6}$ |
| SOUNDING RS SEQUENCE | $C_{3,16}$ $S_{1-6}$ | $C_{3,17}$ $S_{1-6}$ | $C_{3,18}$ $S_{1-6}$ | $C_{3,19}$ $S_{1-6}$ | $C_{3,20}$ $S_{1-6}$ | $C_{3,21}$ $S_{1-6}$ | $C_{3,22}$ $S_{1-6}$ | $C_{3,23}$ $S_{1-6}$ | $C_{3,24}$ $S_{1-6}$ | $C_{3,25}$ $S_{1-6}$ | $C_{3,26}$ $S_{1-6}$ | $C_{3,27}$ $S_{1-6}$ |
| SEQUENCE NOTIFICATION NO. | 12 | 15 | 18 | 19 | 22 | 25 | 20 | 23 | 26 | 21 | 24 | 27 |

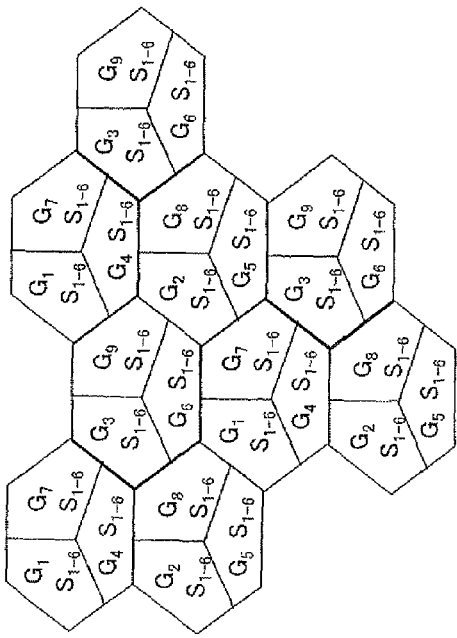
FIG. 12B
PUCCH DM RS SEQUENCE GROUP
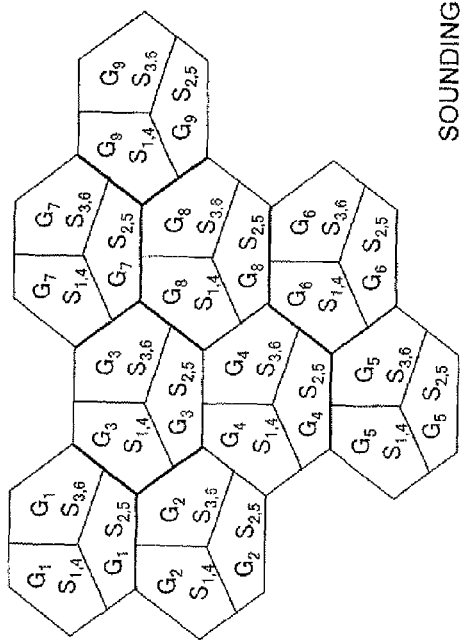
FIG. 12A
PUSCH DM RS SEQUENCE GROUP
FIG. 12C
SOUNDING RS SEQUENCE GROUP

FIG. 13

| CELL INDEX | 1 | | | 2 | | | 3 | | | 4 | | | 5 | | |
|---|---|---|---|---|---|---|---|---|---|---|---|---|---|---|---|
| SECTOR INDEX | 1 | 2 | 3 | 1 | 2 | 3 | 1 | 2 | 3 | 1 | 2 | 3 | 1 | 2 | 3 |
| PUSCH DEMOD. RS SEQUENCE | $G_1$ $S_{1,4}$ | $S_{2,4}$ | $S_{3,6}$ | $G_2$ $S_{1,4}$ | $S_{2,4}$ | $S_{3,6}$ | $G_3$ $S_{1,4}$ | $S_{2,4}$ | $S_{3,6}$ | $G_4$ $S_{1,4}$ | $S_{2,4}$ | $S_{3,6}$ | $G_5$ $S_{1,4}$ | $S_{2,4}$ | $S_{3,6}$ |
| PUCCH DEMOD. RS SEQUENCE | $G_1$ $S_{1-6}$ | $G_4$ $S_{1-6}$ | $G_7$ $S_{1-6}$ | $G_2$ $S_{1-6}$ | $G_5$ $S_{1-6}$ | $G_8$ $S_{1-6}$ | $G_3$ $S_{1-6}$ | $G_6$ $S_{1-6}$ | $G_9$ $S_{1-6}$ | $G_1$ $S_{1-6}$ | $G_4$ $S_{1-6}$ | $G_7$ $S_{1-6}$ | $G_2$ $S_{1-6}$ | $G_5$ $S_{1-6}$ | $G_8$ $S_{1-6}$ |
| SOUNDING RS SEQUENCE | $G_1$ $S_{1-6}$ | $G_4$ $S_{1-6}$ | $G_7$ $S_{1-6}$ | $G_2$ $S_{1-6}$ | $G_5$ $S_{1-6}$ | $G_8$ $S_{1-6}$ | $G_3$ $S_{1-6}$ | $G_6$ $S_{1-6}$ | $G_9$ $S_{1-6}$ | $G_1$ $S_{1-6}$ | $G_4$ $S_{1-6}$ | $G_7$ $S_{1-6}$ | $G_2$ $S_{1-6}$ | $G_5$ $S_{1-6}$ | $G_8$ $S_{1-6}$ |
| SEQUENCE NOTIFICATION NO. | 1 | 4 | 7 | 2 | 5 | 8 | 3 | 6 | 9 | 10 | 13 | 16 | 11 | 14 | 17 |

| CELL INDEX | 6 | | | 7 | | | 8 | | | 9 | | |
|---|---|---|---|---|---|---|---|---|---|---|---|---|
| SECTOR INDEX | 1 | 2 | 3 | 1 | 2 | 3 | 1 | 2 | 3 | 1 | 2 | 3 |
| PUSCH DEMOD. RS SEQUENCE | $G_6$ $S_{1,4}$ | $S_{2,4}$ | $S_{3,6}$ | $G_7$ $S_{1,4}$ | $S_{2,4}$ | $S_{3,6}$ | $G_8$ $S_{1,4}$ | $S_{2,4}$ | $S_{3,6}$ | $G_9$ $S_{1,4}$ | $S_{2,4}$ | $S_{3,6}$ |
| PUCCH DEMOD. RS SEQUENCE | $G_3$ $S_{1-6}$ | $G_6$ $S_{1-6}$ | $G_9$ $S_{1-6}$ | $G_1$ $S_{1-6}$ | $G_4$ $S_{1-6}$ | $G_7$ $S_{1-6}$ | $G_2$ $S_{1-6}$ | $G_5$ $S_{1-6}$ | $G_8$ $S_{1-6}$ | $G_3$ $S_{1-6}$ | $G_6$ $S_{1-6}$ | $G_9$ $S_{1-6}$ |
| SOUNDING RS SEQUENCE | $G_3$ $S_{1-6}$ | $G_6$ $S_{1-6}$ | $G_9$ $S_{1-6}$ | $G_1$ $S_{1-6}$ | $G_4$ $S_{1-6}$ | $G_7$ $S_{1-6}$ | $G_2$ $S_{1-6}$ | $G_5$ $S_{1-6}$ | $G_8$ $S_{1-6}$ | $G_3$ $S_{1-6}$ | $G_6$ $S_{1-6}$ | $G_9$ $S_{1-6}$ |
| SEQUENCE NOTIFICATION NO. | 12 | 15 | 18 | 19 | 22 | 25 | 20 | 23 | 26 | 21 | 24 | 27 |

PUCCH DM RS SEQUENCE
(SEQUENCE LENGTH=12)

SOUNDING RS SEQUENCE
(SEQUENCE LENGTH=36)

PUSCH DM RS SEQUENCE
(SEQUENCE LENGTH=12)

FIG. 15

| CELL INDEX | 1 | | | 2 | | | 3 | | | 4 | | | 5 | | |
|---|---|---|---|---|---|---|---|---|---|---|---|---|---|---|---|
| SECTOR INDEX | 1 | 2 | 3 | 1 | 2 | 3 | 1 | 2 | 3 | 1 | 2 | 3 | 1 | 2 | 3 |
| PUSCH DEMOD. RS SEQUENCE | $C_{1,1}$ | | | $C_{1,2}$ | | | $C_{1,3}$ | | | $C_{1,4}$ | | | $C_{1,5}$ | | |
| | $S_{1,4}$ | $S_{2,5}$ | $S_{3,6}$ | $S_{1,4}$ | $S_{2,5}$ | $S_{3,6}$ | $S_{1,4}$ | $S_{2,5}$ | $S_{3,6}$ | $S_{1,4}$ | $S_{2,5}$ | $S_{3,6}$ | $S_{1,4}$ | $S_{2,5}$ | $S_{3,6}$ |
| PUCCH DEMOD. RS SEQUENCE | $C_{1,1}$ $S_{1-6}$ | $C_{1,4}$ $S_{1-6}$ | $C_{1,7}$ $S_{1-6}$ | $C_{1,2}$ $S_{1-6}$ | $C_{1,5}$ $S_{1-6}$ | $C_{1,8}$ $S_{1-6}$ | $C_{1,3}$ $S_{1-6}$ | $C_{1,6}$ $S_{1-6}$ | $C_{1,9}$ $S_{1-6}$ | $C_{1,1}$ $S_{1-6}$ | $C_{1,4}$ $S_{1-6}$ | $C_{1,7}$ $S_{1-6}$ | $C_{1,2}$ $S_{1-6}$ | $C_{1,5}$ $S_{1-6}$ | $C_{1,8}$ $S_{1-6}$ |
| SOUNDING RS SEQUENCE | $C_{3,1}$ $S_{1-6}$ | $C_{3,4}$ $S_{1-6}$ | $C_{3,7}$ $S_{1-6}$ | $C_{3,2}$ $S_{1-6}$ | $C_{3,5}$ $S_{1-6}$ | $C_{3,8}$ $S_{1-6}$ | $C_{3,3}$ $S_{1-6}$ | $C_{3,6}$ $S_{1-6}$ | $C_{3,9}$ $S_{1-6}$ | $C_{3,10}$ $S_{1-6}$ | $C_{3,13}$ $S_{1-6}$ | $C_{3,16}$ $S_{1-6}$ | $C_{3,11}$ $S_{1-6}$ | $C_{3,14}$ $S_{1-6}$ | $C_{3,17}$ $S_{1-6}$ |
| SEQUENCE NOTIFICATION NO. | 1 | 4 | 7 | 2 | 5 | 8 | 3 | 6 | 9 | 10 | 13 | 16 | 11 | 14 | 17 |

| CELL INDEX | 6 | | | 7 | | | 8 | | | 9 | | |
|---|---|---|---|---|---|---|---|---|---|---|---|---|
| SECTOR INDEX | 1 | 2 | 3 | 1 | 2 | 3 | 1 | 2 | 3 | 1 | 2 | 3 |
| PUSCH DEMOD. RS SEQUENCE | $C_{1,6}$ | | | $C_{1,7}$ | | | $C_{1,8}$ | | | $C_{1,9}$ | | |
| | $S_{1,4}$ | $S_{2,5}$ | $S_{3,6}$ | $S_{1,4}$ | $S_{2,5}$ | $S_{3,6}$ | $S_{1,4}$ | $S_{2,5}$ | $S_{3,6}$ | $S_{1,4}$ | $S_{2,5}$ | $S_{3,6}$ |
| PUCCH DEMOD. RS SEQUENCE | $C_{1,3}$ $S_{1-6}$ | $C_{1,6}$ $S_{1-6}$ | $C_{1,9}$ $S_{1-6}$ | $C_{1,1}$ $S_{1-6}$ | $C_{1,4}$ $S_{1-6}$ | $C_{1,7}$ $S_{1-6}$ | $C_{1,2}$ $S_{1-6}$ | $C_{1,5}$ $S_{1-6}$ | $C_{1,8}$ $S_{1-6}$ | $C_{1,3}$ $S_{1-6}$ | $C_{1,6}$ $S_{1-6}$ | $C_{1,9}$ $S_{1-6}$ |
| SOUNDING RS SEQUENCE | $C_{3,12}$ $S_{1-6}$ | $C_{3,45}$ $S_{1-6}$ | $C_{3,18}$ $S_{1-6}$ | $C_{3,19}$ $S_{1-6}$ | $C_{3,22}$ $S_{1-6}$ | $C_{3,25}$ $S_{1-6}$ | $C_{3,20}$ $S_{1-6}$ | $C_{3,23}$ $S_{1-6}$ | $C_{3,26}$ $S_{1-6}$ | $C_{3,21}$ $S_{1-6}$ | $C_{3,24}$ $S_{1-6}$ | $C_{3,27}$ $S_{1-6}$ |
| SEQUENCE NOTIFICATION NO. | 12 | 15 | 18 | 19 | 22 | 25 | 20 | 23 | 26 | 21 | 24 | 27 |

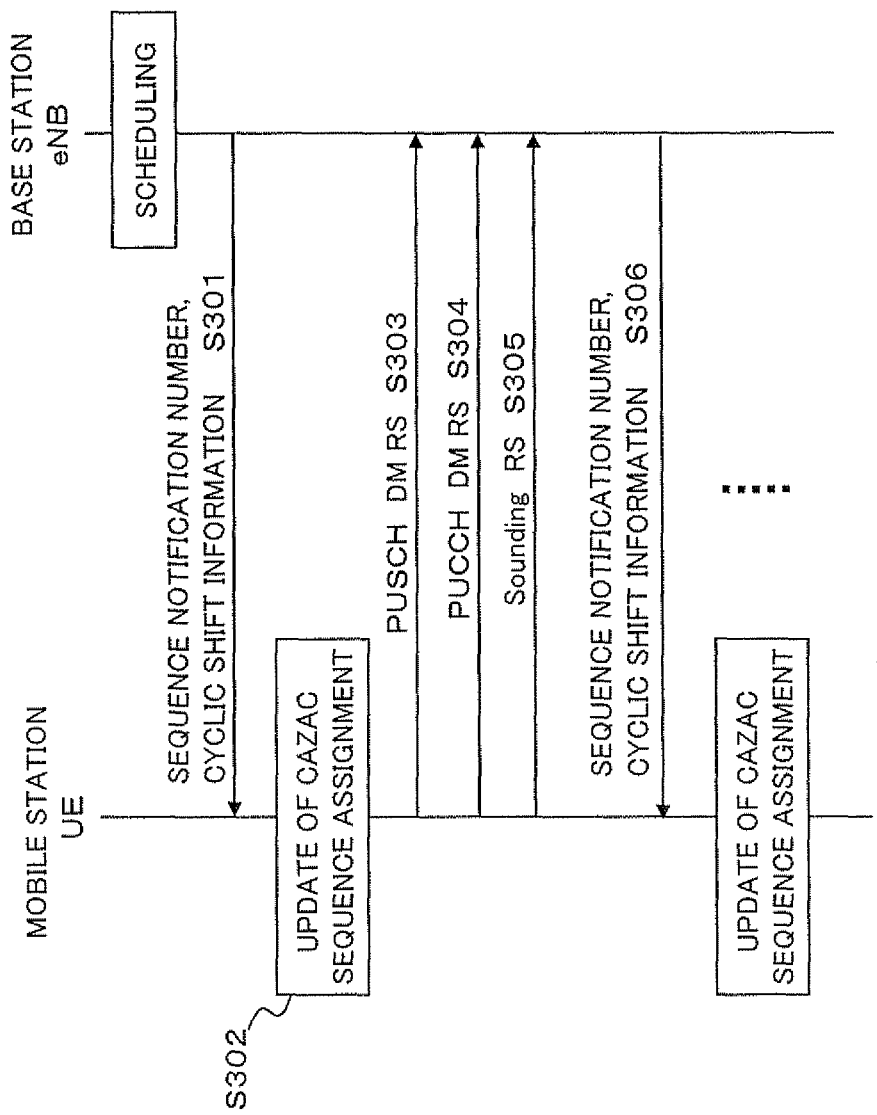

METHOD AND DEVICE FOR ASSIGNING REFERENCE SIGNAL SEQUENCES IN MOBILE COMMUNICATIONS SYSTEM

BACKGROUND OF THE INVENTION

1. Field of the Invention

This application is based upon and claims the benefit of priority from Japanese Patent Application No. 2007-161959, filed on Jun. 19, 2007, the disclosure of which is incorporated herein in its entirety by reference.

The present invention relates to a mobile communications system and, more particularly, to a method and device for assignment of reference signal sequences used for reference signals (also referred to as pilot signals), as well as a base station and a mobile station using the same.

2. Description of the Related Art

In Long Term Evolution (LTE), which is currently being standardized by the 3rd Generation Partnership Project (3GPP), single-carrier transmission is employed as an uplink access scheme in broadband radio access. The single-carrier transmission is an access scheme excellent in power efficiency because the peak-to-average power ratio (PAPR) can be suppressed low in comparison with multi-carrier transmission such as orthogonal frequency division multiplexing (OFDM). Therefore, it can be said that the single-carrier transmission is an access scheme suitable for an uplink from a mobile station (also referred to as user equipment or UE), which has limited battery capacity, to a base station (also referred to as eNB).

For uplink reference signal sequences, constant amplitude zero auto-correlation (CAZAC) sequences are used. The CAZAC sequence is a sequence which has constant amplitude in both of time and frequency domains and exhibits an autocorrelation value of zero at a phase difference of any value other than zero. Because of the constant amplitude in time domain, PAPR can be kept low, and because of the constant amplitude in frequency domain as well, the CAZAC sequence is suitable for channel estimation in frequency domain. As an example of the CAZAC sequence, the Zadoff-Chu sequence represented by the following Equation 1 can be recited (see Popovic, B. M., "Generalized Chirp-Like Polyphase Sequences with Optimum Correlation Properties," IEEE Transactions on Information Theory (July 1992), Vol. 38, No. 4, PP. 1406-1409).

$$c_k(n) = \begin{cases} \exp\left[\frac{j2\pi k}{L}\left(\frac{n^2}{2}+n\right)\right] & \text{when } L \text{ is even} \\ \exp\left[\frac{j2\pi k}{L}\left(n\frac{n+1}{2}+n\right)\right] & \text{when } L \text{ is odd} \end{cases} \quad \text{(Equation 1)}$$

where n=0, 1, ..., and (L−1), L is a sequence length, and k is a sequence number which is an integer prime to L.

The number of CAZAC sequences depends on the length of CAZAC sequence. In the case of the Zadoff-Chu sequence, the number of sequences reaches its peak when the sequence length L is a prime number, and the maximum number of sequences is equal to (L−1). That is, the shorter the length of CAZAC sequences is, the smaller the number of the different CAZAC sequences becomes.

In a case where CAZAC sequences are used for uplink reference signal sequences, code division multiplexing (CDM) is used to multiplex reference signals for a plurality of mobile stations (see 3GPP R1-060925, Texas Instruments, "Comparison of Proposed Uplink Pilot Structures For SC-OFDMA," March 2006). In code division multiplexing of reference signals, orthogonality between the reference signals can be accomplished in such a manner that mobile stations respectively use CAZAC sequences with the same length, and each mobile station (or each antenna) is specified by cyclic shifts of its own CAZAC sequence. Hereinafter, cyclic shifting will be described briefly.

1) Cyclic Shifting

FIG. 1 is a schematic diagram to describe cyclic shifts based on a CAZAC sequence. Referring to FIG. 1, assuming that a CAZAC sequence $C_1$ is a base sequence $S_1$, a sequence $S_2$ is created by shifting the sequence $S_1$ rightward and reattaching the shifted-out end part of the sequence $S_1$ to the top thereof, and a sequence $S_3$ is created by shifting the sequence $S_2$ rightward and reattaching the shifted-out end part of the sequence $S_2$ to the top thereof. By sequentially shifting in a ring manner similarly, sequences $S_4$, $S_5$, $S_6$ and so on are created. Such shifts are called cyclic shifts, and CAZAC sequences created by cyclic shifts are referred to as cyclic shifted sequences. Hereinafter, cyclic shifted sequences are denoted by $S_1$, $S_2$ and so on, using numbers representing the amount of shift.

As mentioned above, since the autocorrelation value of a CAZAC sequence is always zero at a phase difference of any value other than zero, a plurality of reference signals can be made orthogonal even in a multi-path environment if a cyclic shift amount, which corresponds to a total amount reattached from the end part of a sequence to the top thereof, is equivalent to or greater than an assumed maximum delay path time. For example, in a LTE channel model, since the maximum delay path time is approximately 5 μsec and one long block is 66.6 μsec, it is logically possible to obtain 13 cyclic shifted sequences from the calculation of 66.6/5. However, it is presumed that approximately six cyclic shifted sequences can be orthogonalized in practice because impulse responses are widened along a path due to the influence of a filter and the like (see 3GPP R1-071294 Qualcomm Europe, "Link Analysis and Multiplexing Capability for CQI transmission," March 2007).

2) Reference Signal (RS)

Uplink reference signals in LTE can be classified into three broad types: reference signals for demodulation of PUSCH (Physical Uplink Shared CHannel) that mainly transmits data (hereinafter, referred to as PUSCH demodulation reference signals or PUSCH DM RSs); reference signals for demodulation of PUCCH (Physical Uplink Control CHannel) that transmits control signals (hereinafter, referred to as PUCCH demodulation reference signals or PUCCH DM RSs); and reference signals for measurement of uplink channel quality, or reference signals for CQI measurement (hereinafter, referred to as sounding reference signals or sounding RSs).

FIG. 2 is a format diagram showing an example of resource allocation in a slot including PUSCH, PUCCH, reference signals for demodulation of these channels, and a sounding reference signal. One slot includes seven long blocks (LBs). Resource blocks (RBs) on both ends of the entire band are allocated to PUCCH, and PUCCH and PUSCH are multiplexed by frequency division multiplexing (FDM). Note that one resource block includes 12 sub-carriers.

Moreover, PUCCH and PUCCH demodulation reference signals, and PUSCH and PUSCH demodulation reference signals are time-division-multiplexed in their respective bands. A resource in a wide band is allocated to a sounding reference signal, separately from the PUCCH demodulation reference signals and PUSCH demodulation reference signals.

Incidentally, in LTE, it is defined that when one UE (mobile station or user equipment) transmits a control signal and uplink data by using a single slot, the control signal is transmitted along with the data by using PUSCH, and that when a control signal only is transmitted, the control signal is transmitted by using PUCCH. The features of each reference signal will be described hereinafter.

2.a) PUSCH DM RS

With respect to PUSCH, which is mainly used for uplink data transmission, UEs are multiplexed by localized frequency division multiplexing (LFDM). Accordingly, with respect to the PUSCH demodulation reference signal (PUSCH DM RS), UEs are multiplexed similarly by LFDM. Since it is defined in standardization that the minimum transmission band for PUSCH is one resource block (12 sub-carriers), the band for a PUSCH demodulation reference signal similarly includes 12 sub-carriers. Since 11 is the largest prime number (L) that is not greater than 12, ten (=L−1) different CAZAC sequences can be used for reference signal sequences.

When MIMO (Multiple Input Multiple Output), which is a space multiplexing technique, is not applied, the band of a resource block used for PUSCH is occupied by a single UE. Therefore, it is not required to multiplex UEs of PUSCH demodulation reference signals.

On the other hand, when MIMO is applied, multiplexing of reference signals between antennas is required in SU-MIMO (Single User MIMO), and multiplexing of reference signals between UEs is required in MU-MIMO (Multi User MIMO). However, since it is defined that CDM is used to multiplex reference signals when MIMO is applied, the length of reference signal sequence is not reduced. Accordingly, as to the number of cyclic shifted sequences per cell, as many sequences as the number of transmission antennas in the case of SU-MIMO, or the number of multiplexed UEs in the case of MU-MIMO, are basically sufficient.

2.b) PUCCH DM RS

In LTE, feedback information on a downlink signal needs to be transmitted as an uplink control signal. This signal is a data-non-associated control signal, which will be simply referred to as "control signal" hereinafter. An uplink control signal contains acknowledgment/negative acknowledgment (ACK/NACK) indicating whether or not downlink information has been successfully received without error, channel quality indicator (CQI) indicating downlink channel quality, MIMO-related information, and the like. In LTE, it is defined that when one UE transmits a control signal and uplink data by using a single slot, the control signal is transmitted along with the data by using PUSCH, and that when a control signal only is transmitted, the control signal is transmitted by using PUCCH.

To secure the coverage of a control signal, it is defined in standardization that PUCCH is transmitted in a narrow band, as shown in FIG. 2 for example. Moreover, to obtain larger frequency diversity effects in PUCCH transmission in a narrow band, it is defined in standardization that multiplexing of UEs on PUCCH is performed by using CDM for spreading over the band of PUCCH. In this event, a CAZAC sequence is employed as a sequence used as spreading codes, whereby orthogonality between UEs can be accomplished as in the above-described multiplexing of reference signals by CDM.

UE multiplexing is also required with respect to the PUCCH demodulation reference signal (PUCCH DM RS). However, if UE multiplexing is performed by distributed FDM (DFDM), the length of reference signal sequence is reduced, resulting in a smaller number of usable CAZAC sequences. Therefore, for UE multiplexing of PUCCH demodulation reference signals, CDM is employed, by which the length of reference signal sequence is not reduced and a certain number of CAZAC sequences can be secured. However, as mentioned above, PUCCH needs to be used for transmission of not only ACK/NACK from a UE receiving data through a downlink but also CQI which indicates the downlink quality of a UE that is waiting for downlink data transmission to be scheduled. Accordingly, the number of multiplexed UEs on PUCCH is larger than the number of UEs to which downlink data (PDSCH: Physical Downlink Shared CHannel) is transmitting.

FIG. 3 is a format diagram showing an example of the structure of a PUCCH slot. One slot includes seven long blocks (LBs), and in PUCCH, a reference signal (RS) occupies two or three long blocks per slot. Accordingly, it is also possible to increase the number of code-division-multiplexed reference signals by performing block spreading (Walsh covering) for the RS blocks (here, three LBs) by using user-specific orthogonal codes. The number of code-division-multiplexed PUCCH demodulation reference signals can be made two or three times larger by performing block spreading (see 3GPP R1-071293, Qualcomm Europe, "Link Analysis and Multiplexing Capability for UL ACK," March 2007).

Incidentally, it is thought that the band of PUCCH is as wide as one resource block (12 sub-carriers) or so (see 3GPP R1-070782, Motorola, "Multiplexing of UL L1/L2 control signals in the absence of data," February 2007). Accordingly, as described regarding PUSCH, ten CAZAC sequences can be used for the PUCCH demodulation reference signal.

2.c) Sounding RS

In LTE, a sounding reference signal for measurement of uplink channel quality is transmitted, apart from the reference signals for demodulation. A base station measures uplink channel quality by using a sounding reference signal transmitted by a UE and performs channel-dependent frequency scheduling, whereby multi-user diversity effects can be obtained. Since a sounding reference signal needs to be transmitted at least by a UE that is transmitting uplink data and a UE that is waiting for scheduling, a large number of UEs need to be multiplexed in the same band. To multiplex Ues of sounding reference signals, it is defined that frequency division multiplexing (FDM) is used to multiplex UEs that are using different bandwidths, and that code division multiplexing (CDM), by which the length of CAZAC sequence is not reduced, is used to multiplex UEs that are using the same bandwidth.

To obtain multi-user diversity effects of channel-dependent frequency scheduling, it is thought that a sounding reference signal is transmitted in a band wider than one resource block (12 sub-carriers), and the band is currently considered to be as wide as at least six resource blocks or so (see 3GPP R1-072429, NTT DoCoMo, Fujitsu, Mitsubishi Electric, NEC, Panasonic, Sharp, and Toshiba Corporation, "Necessity of Multiple Bandwidth for Sounding Reference Signals," May 2007). However, in the case where UEs are multiplexed by DFDM, the number of sub-carriers that are practically transmitted is 1/RPF, where RPF is Repetition Factor. For example, in the case of six resource blocks, assuming that RPF≈2, a sounding reference signal is thought to have a bandwidth equivalent to three resource blocks (36 sub-carriers) or so. In the case of 36 sub-carriers, since 31 is the largest prime number (L) that is not larger than 36, 30 CAZAC sequences can be used.

3) Grouping of Sequences

In LTE, since the transmission bandwidth of PUSCH is variable, the length of a reference signal sequence used for PUSCH demodulation is also variable. Moreover, it is considered that the sounding reference signal also has multiple transmission bandwidths (see 3GPP R1-072429 cited above). Accordingly, it is necessary to discriminatingly use reference signal sequences of multiple sequence lengths. In general, from the viewpoint of suppression of inter-cell interference, it is preferable that sequences having a small cross correlation value be assigned as reference signal sequences between neighboring cells. However, the cross correlation between CAZAC sequences of different sequence lengths is not always small.

Accordingly, a method is proposed by which CAZAC sequences of multiple sequence lengths are collected as a group and CAZAC sequences are assigned in group units, with consideration given so that the cross-correlation features between CAZAC sequences to be used in neighboring cells become as small as possible (see 3GPP R1-070367, Huawei, "Sequence Allocation Method for E-UTRA Uplink Reference Signal," January 2007, and 3GPP R1-072467, Ericsson, "Uplink reference-signal (DM) structure," May 2007).

According to an example of grouping described in 3GPP R1-072467 cited above, a plurality of groups are made in such a manner that a sequence $C_{1.1}$ of one resource block (a sequence length of 12), sequences $C_{2.1}$ and $C_{2.2}$ of two resource blocks (a sequence length of 24), sequences $C_{3.1}$, $C_{3.2}$ and $C_{3.3}$ of three resource blocks (a sequence length of 36), and so on are collected as a group, and another sequence $C_{1.2}$ of one resource block (a sequence length of 12), other sequences $C_{2.3}$ and $C_{2.4}$ of two resource blocks (a sequence length of 24), other sequences $C_{3.4}$, $C_{3.5}$ and $C_{3.6}$ of three resource blocks (a sequence length of 36), and so on are collected as another group, and so on. The larger the sequence length is, the larger the number of usable CAZAC sequences becomes, and hence the more sequences one group can include.

4) Assignment of Sequences

In a cellular system, the use of the same reference signal sequences between neighboring cells results in inter-cell interference. Therefore, when the same sequences are used, it is necessary to make a reuse distance as large as possible, where the reuse distance is a distance at which the same sequence is repeatedly used. The reuse distance can be also expressed in terms of the number of cells/sectors. Hereinafter, description will be given of a sequence assignment method in a case where CAZAC sequences are used as reference signal sequences.

FIG. 4A is a schematic diagram showing an example of the structure of a cell, FIG. 4B is a schematic diagram showing an example of sequence assignment in a case where CAZAC sequences are used as reference signal sequences, and FIG. 4C is a schematic diagram showing another example of sequence assignment. Referring to FIG. 4A, it is assumed that an arbitrary cell #i has a structure including a plurality of sectors (here, three sectors #i.1, #i.2 and #i.3). "Sector" and "cell" are sometimes referred to as "cell" and "eNB" respectively. Using the terms "cell" and "eNB," it can also be defined that a plurality of cells constitute one base station (eNB). Here, as an example, only a case where a reference signal corresponds to one resource block (has a sequence length of 12) is shown. Moreover, in FIGS. 4B and 4C, $C_{1.1}$ to $C_{1.9}$ denote mutually different CAZAC sequences, and $S_1, S_2, \ldots$ denote cyclic shifted sequences based on a CAZAC sequence (the same will apply hereinafter).

In a cellular system shown in FIG. 4B, one cell has three sectors, and one CAZAC sequence is assigned to each sector for the above-described three types of reference signals (this assignment method will be referred to as sector repetition assignment, or also referred to as cell-specific assignment). Here, since nine CAZAC sequences $C_{1.1}$ to $C_{1.9}$ are repeatedly assigned to sectors, the same CAZAC sequences are repeatedly assigned every three cells.

In a cellular system shown in FIG. 4C as well, one cell has three sectors. However, one CAZAC sequence is assigned to each base station (cell) for the above-described three types of reference signals (this assignment method will be referred to as cell repetition assignment, or also referred to as eNB-specific assignment). In the cell repetition assignment, cyclic shifted sequences S based on a CAZAC sequence C assigned to each cell are assigned to the sectors in the cell in question. Here, since nine CAZAC sequences $C_{1.1}$ to $C_{1.9}$ are repeatedly assigned to cells, the same CAZAC sequences are repeatedly assigned every nine cells, and in each cell, different cyclic shifted sequences based on a CAZAC sequence assigned to the cell in question are assigned to three sectors constituting the cell in question.

However, according to the sector repetition assignment method shown in FIG. 4B, particularly in a case where the number of CAZAC sequences is small, the reuse distance between cells using the same reference signals is small, causing the problem of inter-cell interference. For example, when a minimum number of CAZAC sequences, that is, ten CAZAC sequences are used as reference signal sequences for PUSCH demodulation and PUCCH demodulation, then the sequences are repeated every nine sectors, with the result that interference equivalent to that in the case of 3-cell repetition occurs in the end. For example, the same CAZAC sequences $C_{1.1}$ are assigned to a sector 1.1 in a first cell and to a sector 4.1 in a fourth cell.

On the other hand, according to the cell repetition assignment method shown in FIG. 4C, cyclic shifted sequences are used to accomplish orthogonality between sectors. Therefore, the number of cyclic shifted sequences used to multiplex UEs per sector is reduced, resulting in a smaller number of UE code-division-multiplexing of reference signals. That is, as described above, for example, six cyclic shifted sequences $S_1$ to $S_6$ can be used based on the CAZAC sequence $C_{1.1}$ assigned to the first cell. Therefore, only two sequences can be assigned to each sector, and accordingly only two UEs can be multiplexed by CDM in the same bandwidth with respect to all types of reference signals.

As described above, according to the sector repetition assignment, although the number of cyclic shifted sequences per sector can be large, the reuse distance is short. Conversely, according to the cell repetition assignment, although the reuse distance can be long, the number of cyclic shifted sequences per sector is small. Accordingly, the use of any one of the sector repetition assignment method and cell repetition assignment method for all types of reference signal sequences, such as the PUSCH demodulation reference signal, PUSCCH demodulation reference signal, and sounding reference signal, inevitably leads to a reduction in either the number of cyclic shifted sequences per sector or the reuse distance.

SUMMARY OF THE INVENTION

An object of the present invention is to provide a sequence assignment method and device that can reduce the influence of inter-cell interference and also can increase the number of users per sector that can be multiplexed by CDM.

According to the present invention, in a mobile communications system having a plurality of cells, each of which includes a plurality of sectors, a plurality of pseudo-orthogonal sequences used for reference signals are assigned to cells or sectors using a plurality of repetition patterns.

According to the present invention, it is possible to reduce the influence of inter-cell interference, and also to increase the number of users per sector that can be multiplexed by CDM.

BRIEF DESCRIPTION OF THE DRAWINGS

FIG. 6 is a diagram showing groups including CAZAC sequences of multiple different sequence lengths.

FIG. 7 is a sequence assignment table showing, on a cell/sector basis, the assignment of reference signal sequences according to the first exemplary embodiment of the present invention.

FIG. 9 is a sequence assignment table showing, on a cell/sector basis, the assignment of the reference signal sequences shown in FIGS. 8A and 8B.

FIG. 11 is a sequence assignment table showing, on a cell/sector basis, the assignment of reference signal sequences according to the second exemplary embodiment of the present invention.

FIG. 12A is a cell structure diagram showing an example of a method for cell repetition assignment of sequence groups with respect to the PUSCH demodulation reference signal according to a third exemplary embodiment of the present invention.

FIG. 12B is a cell structure diagram showing an example of a method for sector repetition assignment of sequence groups with respect to the PUCCH demodulation reference signal according to the third exemplary embodiment.

FIG. 12C is a cell structure diagram showing an example of a method for sector repetition assignment of sequence groups with respect to the sounding reference signal according to the third exemplary embodiment.

FIG. 13 is a sequence assignment table showing, on a cell/sector basis, the assignment of reference signal sequences according to the third exemplary embodiment of the present invention.

FIG. 15 is a sequence assignment table showing, on a cell/sector basis, the assignment of the reference signal sequences shown in FIGS. 14A to 14C.

FIG. 18 is a sequence diagram showing a sequence assignment procedure in the mobile communications system to which the sequence assignment method according to any one of the first to third exemplary embodiments of the present invention is applied.

DETAILED DESCRIPTION OF THE PREFERRED EMBODIMENTS

Figure 4C:
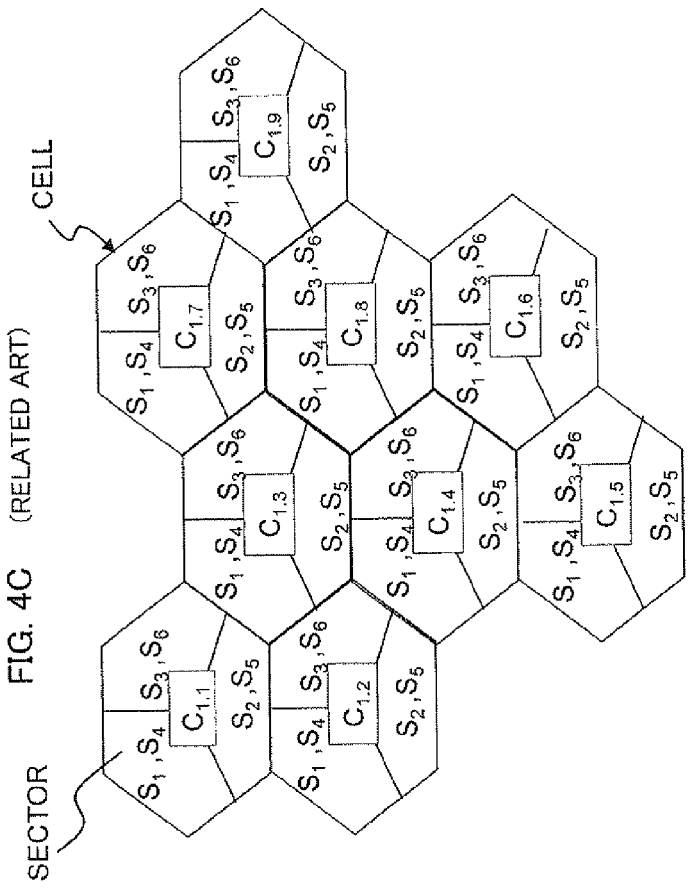
FIG. 4C is a schematic diagram showing another example of sequence assignment.
Figure 4A:
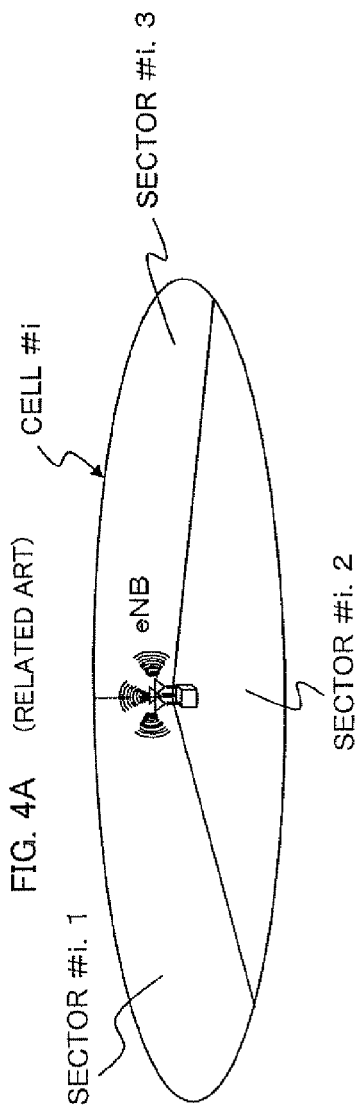
FIG. 4A is a schematic diagram showing an example of the structure of a cell.
Figure 4B:
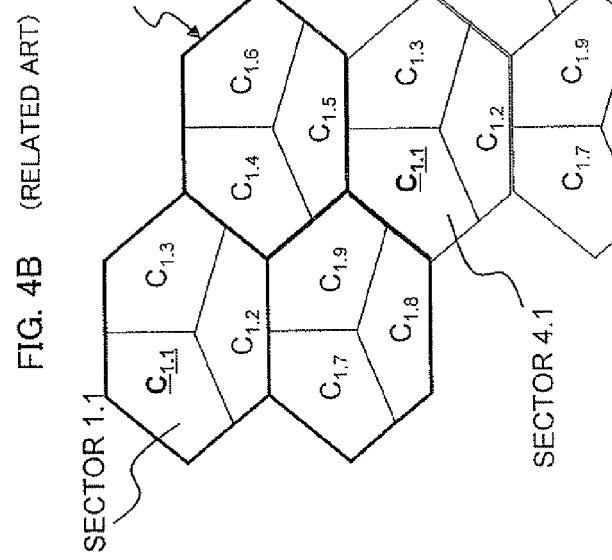
FIG. 4B is a schematic diagram showing an example of sequence assignment in a case where CAZAC sequences are used as reference signal sequences.

Hereinafter, exemplary embodiments of the present invention will be described in detail, by taking the cell structure shown in FIG. 4A as an example to avoid complicating the description. That is, it is assumed that one base station (eNB) has a cell structure including three sectors. However, the present invention does not intend to limit the number of sectors to three. Incidentally, the terms "sector" and "cell" are sometimes referred to also as "cell" and "eNB" respectively. In addition, for a reference signal sequence, a CAZAC sequence is assumed to be used.

1. First Exemplary Embodiment

Figure 5B:
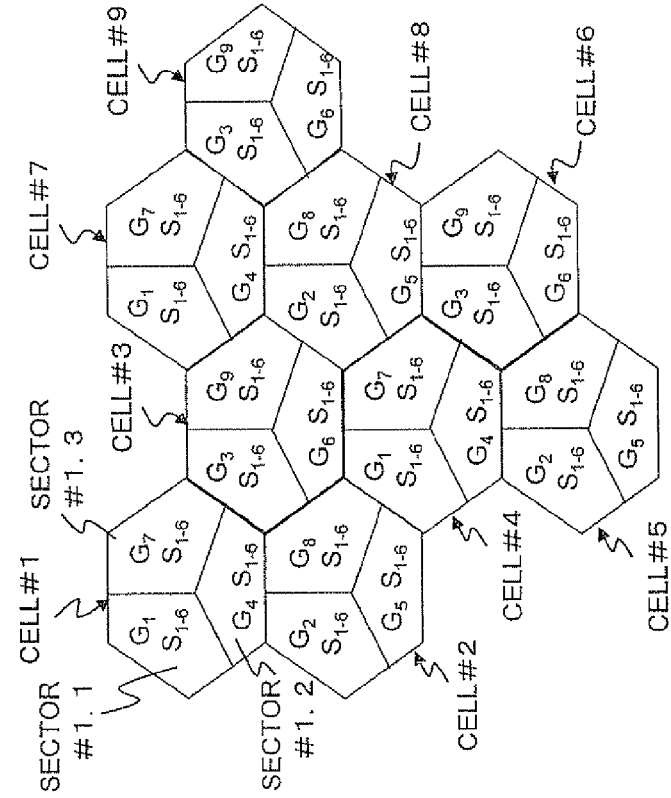
FIG. 5B is a cell structure diagram showing an example of sector repetition assignment of reference signal sequence groups according to the first exemplary embodiment.
Figure 5A:
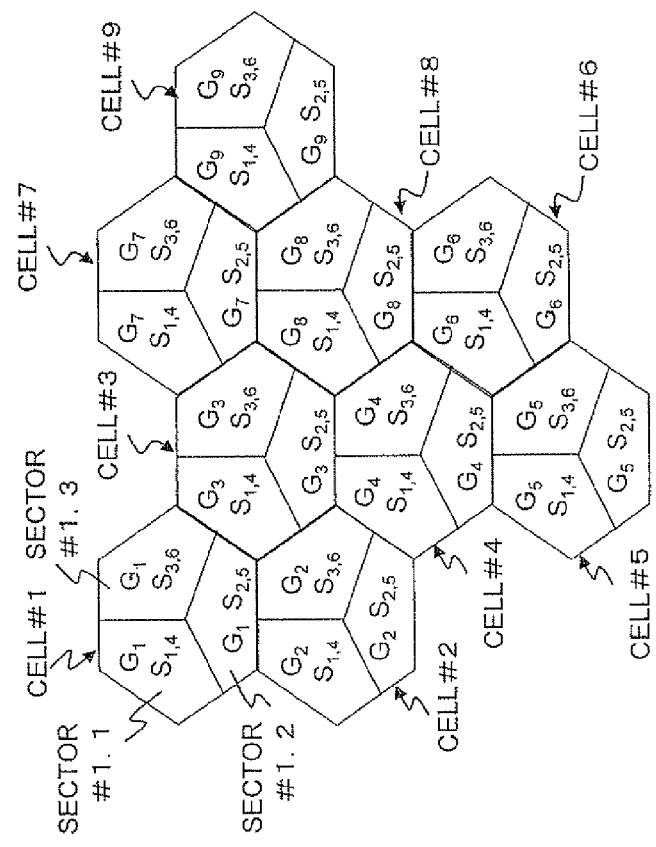
FIG. 5A is a cell structure diagram showing an example of cell repetition assignment of reference signal sequence groups according to a first exemplary embodiment of the present invention.

FIG. 5A is a cell structure diagram showing an example of cell repetition assignment of reference signal sequence groups according to a first exemplary embodiment of the present invention. FIG. 5B is a cell structure diagram showing an example of sector repetition assignment of reference signal sequence groups according to the present exemplary embodiment. Here, nine cells #1 to #9 are shown as an example, and each cell #i is assumed to include three sectors #i.1 to #i.3. FIGS. 5A and 5B show the same cells #1 to #9.

In FIGS. 5A and 5B, $G_1$ to $G_9$ denote groups, which will be described later, and $S_1$ to $S_6$ denote six cyclic shifted sequences based on any reference signal sequence. Moreover, an expression "$S_{x,y}$," denotes two cyclic shifted sequences $S_x$ and $S_y$, such as "$S_{1,4}$" denoting two cyclic shifted sequences $S_1$ and $S_4$, and an expression "$S_{1-6}$" denotes six cyclic shifted sequences $S_1$ to $S_6$. The same will hold true hereinafter.

Note that cyclic shifted sequences $S_1, S_2, \ldots$ are general expressions. As described already, if reference signal sequences are different, cyclic shifted sequences respectively created based on these reference signal sequences are different as a matter of course even if they are denoted by the same symbols and numerals. For example, referring to FIG. 5A, cyclic shifted sequences $S_{1,4}$ under the group $G_1$ assigned to the sector #1.1 in the cell #1 represent the first and fourth cyclic shifted sequences $S_1$ and $S_4$ of six cyclic shifted sequences $S_1$ to $S_6$ based on a reference signal sequence belonging to the group $G_1$. Similarly, cyclic shifted sequences $S_{1,4}$ under the group $G_2$ assigned to the sector #2.1 in the cell #2 represent the first and fourth cyclic shifted sequences $S_1$ and $S_4$ of six cyclic shifted sequences $S_1$ to $S_6$ based on a reference signal sequence belonging to the group $G_2$. Accordingly, even if denoted by the same symbols and numerals "$S_{1,4}$," the cyclic shifted sequences $S_{1,4}$ under the group $G_1$ and the cyclic shifted sequences $S_{1,4}$ under the group $G_2$ are different because their base reference signal sequences are different.

According to the present invention, a method for assigning reference signal sequences is selected depending on the features of a reference signal and a required condition. In the present exemplary embodiment, cell repetition assignment is employed to assign groups of reference signal sequences used for PUSCH (Physical Uplink Shared CHannel) and PUCCH (Physical Uplink Control CHannel), as shown in FIG. 5A. Sector repetition assignment is employed to assign groups of sounding reference signal sequences, as shown in FIG. 5B. Hereinafter, a reference signal sequence assignment method according to the present exemplary embodiment will be described in detail, after description of the features and conditions of a sequence group and reference signals used in the present exemplary embodiment.

1.1) Grouping

Assignment of sequence groups is proposed from the viewpoint that, as described already, although it is necessary to discriminatingly use multiple reference signal sequences of different sequence lengths, the correlation between CAZAC sequences of different sequence lengths is not always small (see 3GPP R1-070367 and 3GPP R1-072467 cited earlier). That is, in assignment of sequence groups, some CAZAC sequences of multiple different sequence lengths are collected as a group while the characteristics of the correlation between the CAZAC sequences are considered, and CAZAC sequences are assigned in group units. Such different CAZAC sequences having a sufficiently small but non-zero correlation will be referred to as "pseudo-orthogonal sequences." Moreover, sequences created based on such a pseudo-orthogonal sequence, for example, cyclic shifted sequences created by cyclically shifting a CAZAC sequence as described above will be referred to as "orthogonal sequences." Hereinafter, an example of a method of making a group of sequences used in the present exemplary embodiment will be presented.

FIG. 6 is a diagram showing groups including CAZAC sequences of multiple different sequence lengths. The group numbers $G_1$ to $G_9$ denote different groups of CAZAC sequences (pseudo-orthogonal sequences). For example, in the case of one resource block (here, the sequence length is 12, and therefore L=11), nine CAZAC sequences $C_{1,1}$ to $C_{1,9}$ are placed in the groups $G_1$ to $G9$, respectively. Similarly, in the case of two resource blocks (here, the sequence length is 24, and therefore L=23), 18 CAZAC sequences $C_{2,1}$ to $C_{2,18}$ are placed two by two in the groups $G_1$ to $G_9$, respectively. In the case of three resource blocks (here, the sequence length is 36, and therefore L=31), 27 CAZAC sequences $C_{3,1}$ to $C_{3,27}$ are placed three by three in the groups $G_1$ to $G_9$, respectively. In such a manner, in the case of N resource blocks, (9×N) CAZAC sequences are placed N by N in the groups $G_1$ to $G_9$, respectively. Thus, for example, the group $G_1$ includes the sequence $C_{1,1}$ of one resource block, the sequences $C_{2,1}$ and $C_{2,2}$ of two resource blocks, the sequences $C_{3,1}, C_{3,2}$ and $C_{3,3}$ of three resource blocks, and so on. Each of the subsequent groups is made similarly.

According to the present exemplary embodiment, using the thus made groups $G_1$ to $G_9$ as units, assignment of CAZAC sequences is performed in accordance with the under-mentioned types (here, features and required conditions) of reference signals, through cell repetition assignment in the case shown in FIG. 5A, or sector repetition assignment in the case shown in FIG. 5B.

1.2) Features and Required Conditions of RSs

According to the present exemplary embodiment, an appropriate sequence assignment method is selected for each type of reference signal with consideration given to the features and required conditions of the reference signals, whereby it is possible to increase both the number of cyclic shifted sequences per sector and the reuse distance. The features and required conditions of each type of reference signal are summarized below, which are described before (see 2. Description of Related Art, 2) Reference signal).

1.2.a) PUSCH DM RS

Features:

CDM using cyclic shifted sequences is not employed for mobile-station (UE) multiplexing when MIMO is not applied. CDM is employed only when MIMO is applied.

The sequence length varies depending on frequency scheduling. The minimum sequence length is 12.

Required Conditions:

The reuse distance should be long.

1.2.b) PUCCH DM RS

Features:

CDM using cyclic shifted sequences is employed for UE multiplexing.

The number of UEs transmitting PUCCH demodulation reference signals is large because not only ACK/NACK is transmitted from a UE that is the destination of downlink data but also CQI is transmitted from a UE that is waiting for a downlink resource to be scheduled.

Required Conditions:

The reuse distance should be long.

As many UEs as possible should be multiplexed for efficient use of resources.

1.2.c) Sounding RS

Features:

CDM using cyclic shifted sequences is employed for UE multiplexing.

The minimum sequence length is 36 (when bandwidth BW=1.25 MHz, and repetition factor RPF=2).

The number of mobile stations transmitting sounding reference signals is large because a sounding reference signal is transmitted not only by a UE that is transmitting uplink data but also by a UE that is waiting for an uplink resource to be scheduled.

Required Conditions:

The reuse distance should be long.

As many mobile stations as possible should be multiplexed for efficient use of resources.

It is preferable that a sequence assignment method be determined for each type of reference signal with consideration given to the above described features and required conditions of each type of reference signal.

1.3) Sequence Assignment for RSs

According to the present exemplary embodiment, considering the above-described features and required conditions, cell repetition assignment is applied with respect to the PUSCH demodulation reference signal and PUCCH demodulation reference signal, and sector repetition assignment is applied with respect to the sounding reference signal.

1.3a) Sequence assignment for PUSCH DM RS

Cell repetition assignment is employed for group assignment with respect to PUSCH demodulation reference signals, as shown in FIG. 5A. Specifically, the nine groups $G_1$ to $G_9$ are assigned to the different cells #1 to #9 respectively. The reasons for employing cell repetition assignment in the case of PUSCH demodulation reference signals are as follows.

(1) Cell repetition assignment can make a long reuse distance in comparison with sector repetition assignment.

(2) If two cyclic shifted sequences are assigned per sector, it is possible to support 2-antenna multiplexing when SU-MIMO is applied. Further, in the case where two long blocks for PUSCH demodulation reference signal are included in a single slot, it is also possible to support 4-antenna multiplexing, which are double, by applying block spreading (Walsh covering).

(3) Sector repetition assignment cannot make a sufficiently long reuse distance particularly when the sequence length is the smallest (=12).

Referring to FIG. 5A, in each cell, six cyclic shifted sequences $S_{1-6}$ based on any reference signal sequence belonging to a group assigned to the cell are assigned to the three sectors in the cell. Accordingly, two cyclic shifted sequences (here, $S_{1,4}$, $S_{2,5}$ and $S_{3,6}$) are assigned to each of the three sectors, whereby orthogonality between two UEs can be accomplished in each sector.

For example, in the first sector #1.1 of the cell #1 which is assigned the group $G_1$, if the transmission band of PUSCH corresponds to two resource blocks, two cyclic shifted sequences $S_1$ and $S_4$ based on a reference signal sequence $C_{2.1}$ can be assigned. In the case where MIMO is not applied, since the band corresponding to the resource blocks used for PUSCH is occupied by one UE, UE multiplexing is not required with respect to the PUSCH demodulation reference signal. However, in the case where MIMO is applied, reference signals need to be multiplexed between antennas in SU-MIMO, and between UEs in MU-MIMO. Hence, cyclic shifted sequences assigned to each sector can be used to orthogonalize reference signals between sectors and to orthogonalize reference signals when MIMO is applied.

Note that the above case such that the cyclic shifted sequences $S_{1,4}$, $S_{2,5}$ and $S_{3,6}$ respectively assigned to the three sectors is an example. Cyclic shifted sequences $S_{1,2}$, $S_{3,4}$ and $S_{5,6}$ may be assigned to the three sectors respectively.

1.3b) Sequence assignment for PUCCH DM RS

According to the present exemplary embodiment, cell repetition assignment is also employed with respect to PUCCH demodulation reference signal, as shown in FIG. 5A. The reasons for employing cell repetition assignment in the case of the PUCCH demodulation reference signal are as follows.

(1) According to cell repetition assignment, as described above, the number of cyclic shifted sequences per sector is small, and accordingly the number of code-division-multiplexed mobile stations (hereinafter, also denoted by CDM-UEs) with respect to PUCCH is also small. However, the number of CDM-UEs can be increased by applying block spreading (Walsh covering). For example, in a case where three long blocks for the PUCCH demodulation reference signals are included in one slot, if two cyclic shifted sequences can be used in each sector, the number of CDM-UEs can be increased to six (2×3) or so at the largest by applying Walsh covering when ACK/NACK is transmitted.

(2) According to sector repetition assignment, in a similar case, since six cyclic shifted sequences can be used, the number of CDM-UEs can be increased to 18 (6×3) at the largest by applying Walsh covering. However, the reuse distance is short.

For the above reasons, in the present exemplary embodiment, cell repetition assignment is employed with respect to PUCCH.

As described above, according to the cell repetition assignment, since the reuse distance can be made large, inter-cell interference can be suppressed as in the case of the PUSCH demodulation reference signal. In this case, cyclic shifted sequences based on each CAZAC sequence are used to orthogonalize reference signals between cells and to orthogonalize reference signals of users transmitting PUCCH.

1.3c) Sequence Assignment for Sounding RS

Sector repetition assignment is employed for group assignment with respect to the sounding reference signal, as shown in FIG. 5B. Specifically, the nine groups $G_1$ to $G_9$ are sequentially assigned to the different sectors #1.1, #1.2, #1.3, #2.1, #2.2, and so on. Here, the groups $G_1$, $G_4$ and $G_7$ are assigned to the sectors #1.1 to #1.3 in the cell #1 respectively, and the groups $G_2$, $G_5$ and $G_8$ are assigned to the sectors #2.1 to #2.3 in the cell #2 respectively. In such a manner, the groups are assigned to sectors through sector repetition assignment. Note that this order in which the groups are assigned is an example. For example, it is also possible to assign the groups $G_1$ to $G_3$ to the sectors #1.1 to #1.3 in the cell #1 respectively.

Incidentally, in a case where the number of resource blocks is large, since a large number of reference signal sequences are included in a group as shown in FIG. 6, different sequences can be assigned even if the same groups are assigned, as long as the number of the different sequences is not greater than the number of the reference signal sequences included in the group. For example, although the sector #1.1 in the cell #1 and the sector #4.1 in the cell #4 are each assigned the same group $G_1$, the sectors #1.1 and #4.1 can be assigned different reference signal sequences $C_{3.1}$ and $C_{3.2}$ respectively as can be seen from the items in the row "$G_1$" and the column "3 RESOURCE BLOCKS" of the table of FIG. 6. The details thereof will be described later.

By performing assignment as described above, in each sector, it is possible to use a maximum number of cyclic shifted sequences (here, $S_{1-6}$, that is, $S_1$ to $S_6$) based on a reference signal sequence belonging to a group assigned to the sector. The reasons for employing sector repetition assignment in the case of the sounding reference signal are as follows.

(1) According to the cell repetition assignment, although a long reuse distance can be made, the number of usable cyclic shifted sequences per sector is small. In the above-described example, two cyclic shifted sequences can be used in each sector.

(2) According to the sector repetition assignment, the number of reference signal sequences is large due to its wide bandwidth. Accordingly, the reuse distance is sufficiently long even if sector repetition assignment is employed. In the above-described example, six cyclic shifted sequences can be used in each sector.

As described above, since the minimum sequence length (here, 36) of CAZAC sequences for the sounding reference signal is large in comparison with the minimum sequence length (here, 12) of CAZAC sequences used for PUSCH demodulation and PUCCH demodulation, the number of sequences is large, reducing the problem related to the reuse distance. Accordingly, sector repetition assignment, which can make a large number of cyclic shifted sequences, is suitable for sequence assignment with respect to the sounding reference signal. In this case, all cyclic shifted sequences based on each CAZAC sequence can be used to orthogonalize users that are transmitting sounding reference signals.

1.4) Sequence Assignment Table

According to the present exemplary embodiment, considering the above-described features and required conditions of each type of reference signal, cell repetition assignment is employed with respect to the PUSCH demodulation reference signal and PUCCH demodulation reference signal, and sector repetition assignment is employed with respect to the sounding reference signal. From the standpoint of each cell and sector, the assignment methods can be described as follows.

FIG. 7 is a sequence assignment table showing, on a cell/sector basis, the assignment of reference signal sequences according to the first exemplary embodiment of the present invention. Here, shown are the exemplary uses of the reference signal sequence groups $G_1$ to $G_9$ and cyclic shifted sequences $S_1$ to $S_6$ as shown in FIGS. 5A and 5B, showing which groups and cyclic shifted sequences are used in each cell and sector.

For example, referring to the cell #1, with respect to the PUSCH demodulation reference signal sequence, the group $G_1$ is assigned to the cell #1, and six cyclic shifted sequences $S_1$ to $S_6$ are assigned to the sectors #1.1, #1.2 and #1.3 by twos (here, $S_{1,4}$, $S_{2,5}$ and $S_{3,6}$ respectively). Assignment is similarly performed with respect to the PUCCH demodulation reference signal sequence.

Moreover, with respect to the sounding reference signal sequencer the nine groups $G_1$ to $G_9$ are sequentially assigned to the different sectors #1.1, #1.2, #1.3, #2.1, #2.2, and so on. For example, the groups $G_1$, $G_4$ and $G_7$ are assigned to the sectors #1.1 to #1.3 of the cell #1 respectively, and cyclic shifted sequences (here, $S_{1-6}$, that is, $S_1$ to $S_6$) based on a reference signal sequence belonging to the assigned one of the groups $G_1$, $G_4$ and $G_7$ can be used in each sector. However, as described with reference to FIG. 6, even using the same groups, since the number of usable reference signal sequences increases with an increase in the number of resource blocks, the problem related to the reuse distance is small in the case of the sounding reference signal sequence.

For example, it is assumed that a PUSCH/PUCCH demodulation reference signal corresponds to one resource block, and that a sounding reference signal corresponds to three resource blocks. In this case, with respect to the PUSCH/PUCH demodulation reference signal, 9-cell repetition assignment is employed by which reference signal sequences $C_{1,1}$ to $C_{1,9}$ belonging to the groups $G_1$ to $G_9$ as shown in FIG. 6 are assigned to the cell #1 to #9 respectively. With respect to the sounding reference signal, 27-sector repetition assignment is employed by which reference signal sequences $C_{3,1}$ to $C_{3,27}$ belonging to the groups $G_1$ to $G_9$ as shown in FIG. 6 are assigned to the sectors #1.1 to #9.3 of the cells #1 to #9 respectively. Accordingly, the level of interference of every type of reference signal is equivalent to the level of interference in the case of 9-cell repetition. A specific example thereof will be described later.

As described above, according to the present exemplary embodiment, two cyclic shifted sequences per sector can be used with respect to the PUSCH demodulation reference signal, two cyclic shifted sequences, with respect to the PUCCH demodulation reference signal, and six cyclic shifted sequences, with respect to the sounding reference signal. Here, the cyclic shifted sequences for PUSCH demodulation assigned to each sector are used only when MIMO is applied. However, the cyclic shifted sequences for PUCCH demodulation and the cyclic shifted sequences for sounding are used for UE multiplexing. Incidentally, with respect to the PUCCH demodulation reference signal, the number of CDM-UEs can be increased to six (2×3) by using the aforementioned block spreading (Walsh covering) if a reference signal in one slot corresponds to three long blocks.

1.5) Notification of Sequence Assignment

Since an uplink reference signal is used for channel estimation or for channel quality measurement, it is necessary that an assigned reference signal sequence should be known to both of a base station and a mobile station (UE) in advance. To this end, the base station notifies each mobile station of a reference signal sequence to use.

According to the present exemplary embodiment, the base station does not notify each one of reference signal sequence groups to use, but notifies a sequence notification number shown in the bottom row of the table of FIG. 7 to each mobile station. If a base station and a mobile station share a sequence assignment table as shown in FIG. 7 in advance, the mobile station can identify reference signal sequence groups and cyclic shifted sequences under the groups by the base station notifying a sequence notification number. For example, when receiving a sequence notification number "1," the mobile station knows that cyclic shifted sequences $S_1$ and $S_4$ under the CAZAC sequence group $G_1$ are used for the PUSCH/PUCCH demodulation reference signal, and that cyclic shifted sequences $S_1$ to $S_6$ under the group $G_1$ are used for the sounding reference signal. Moreover, when receiving a sequence notification number "5," the mobile station knows that cyclic shifted sequences $S_2$ and $S_5$ under the CAZAC sequence group $G_2$ are used for the PUSCH/PUCCH demodulation reference signal, and that cyclic shifted sequences $S_1$ to $S_1$ under the group $G_5$ are used for the sounding reference signal.

With correspondences thus made among each type of reference signal sequence group, three types of reference signal sequence groups are collectively notified at a timer whereby required information about sequence assignment can be notified using a small overhead.

Incidentally, cell/sector-specific information, which includes information about a CAZAC sequence group and cyclic shifted sequences with respect to the PUSCH demodulation reference signal, a CAZAC sequence group and cyclic shifted sequences with respect to the PUCCH demodulation reference signal, and a CAZAC sequence group with respect to the sounding reference signal, is transmitted through a broadcast channel (BCH) or the like, which is a common channel among cells. These pieces of information transmitted through BCH are contained in the above-mentioned information about sequence assignment. Moreover, user-specific information, which includes information about a cyclic shifted sequence for the PUCCH demodulation reference signal and a cyclic shifted sequence for the sounding reference signal, is transmitted through PDCCH (Physical Downlink Control CHannel) or the like for mainly transmitting a downlink control signal. For example, when a PUCCH demodulation reference signal and a sounding reference signal are multiplexed by CDM, a user-specific cyclic shifted sequence is required as information specific to the user.

1.6) Specific Example

Next, a specific example of the reference signal sequence assignment method according to the present exemplary embodiment shown in FIGS. 5A, 5B, and 7 will be presented.

Figure 8B:
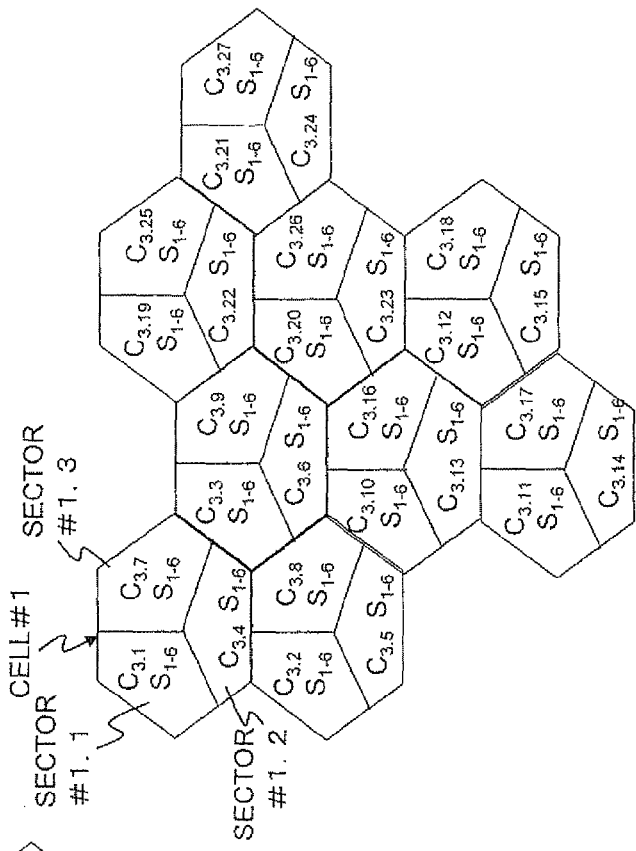
FIG. 8B is a cell structure diagram showing an example of sector repetition assignment under similar conditions.

FIG. 5A is a cell structure diagram showing an example of cell repetition assignment of CAZAC sequences and their cyclic shifted sequences to be used in individual cells in a case where the PUSCH/PUCCH demodulation reference signal has a sequence length of 12, and the sounding reference signal has a sequence length of 36. FIG. 8B is a cell structure diagram showing an example of sector repetition assignment under similar conditions. The structures of a cell and sector are similar to those shown in FIGS. 5A and 5B, and therefore description thereof will be omitted.

For the PUSCH/PUCCH demodulation reference signals since its sequence length is 12, CAZAC sequences $C_{1,1}$ to $C_{1,9}$, which are shown in the column "1 RESOURCE BLOCK" of the table of FIG. 6, are used. For the sounding reference signal, since its sequence length is 36, CAZAC sequences $C_{3,1}$ to $C_{3,27}$, which are shown in the column "3 RESOURCE BLOCKS" of the table of FIG. 6, are used.

Figure 8A:
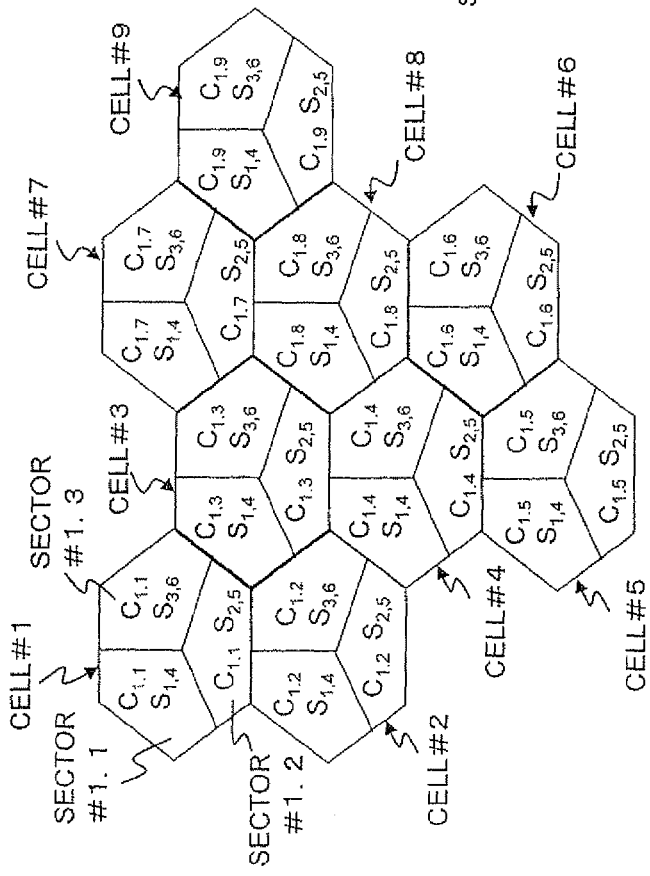
FIG. 8A is a cell structure diagram showing an example of cell repetition assignment of CAZAC sequences and their cyclic shifted sequences to be used in individual cells in a case where the PUSCH/PUCCH demodulation reference signal has a sequence length of 12 and the sounding reference signal has a sequence length of 36.

Referring to FIG. 8A, the CAZAC sequences $C_{1,1}$ to $C_{1,9}$ of the groups $G_1$ to $G_6$ are assigned to cells through 9-cell repetition assignment, and cyclic shifted sequences $S_{1-6}$ based on each CAZAC sequence are assigned to three sectors in each cell. For example, the CAZAC sequence $C_{1,1}$ is assigned to the cell #1, and cyclic shifted sequences $S_{1,4}$, $S_{2,5}$ and $S_{3,6}$ based on the CAZAC sequence $C_{1,1}$ are assigned to the sectors #1.1 to #1.3 in the cell #1 respectively.

Referring to FIG. 8B, the CAZAC sequences $C_{3,1}$ to $C_{3,27}$ for the sounding reference signal are assigned to sectors through 27-sector repetition assignment, and cyclic shifted sequences $S_{1-6}$ based on the assigned CAZAC sequence can be used in each sector. For example, the sequences $C_{3,1}$, $C_{3,4}$ and $C_{3,7}$ are assigned to the sectors #1.1 to #1.3 in the cell #1 respectively, the sequences $C_{3,2}$, $C_{3,5}$ and $C_{3,8}$ are assigned to the sectors #2.1 to #2.3 in the cell #2 respectively, and so on.

FIG. 9 is a sequence assignment table showing, on a cell/sector basis, the assignment of the reference signal sequences shown in FIGS. 8A and 8B. Here, shown are the exemplary uses of the CAZAC sequences $C_{1,1}$ to $C_{1,9}$ and $C_{3,1}$ to $C_{3,27}$ and their cyclic shifted sequences $S_1$ to $S_6$, showing which CAZAC sequences and cyclic shifted sequences are used in each cell and sector.

For example, referring to the cell #1, with respect to the PUSCH demodulation reference signal sequence, the sequence $C_{1,1}$ of the group $G_1$ is assigned to the cell #1, and six cyclic shifted sequences $S_1$ to $S_6$ based on the sequence $C_{1,1}$ are assigned to the sectors #1.1 to #1.3 by twos (here, $S_{1,4}$, $S_{2,5}$ and $S_{3,6}$ respectively). Assignment is similarly performed with respect to the PUCCH demodulation reference signal sequence.

Moreover, with respect to the sounding reference signal sequence, the sequences $C_{3,1}$ to $C_{3,27}$ of the nine groups $G_1$ to $G_9$ are sequentially assigned to the different sectors #1.1, #1.2, #1.3, #2.1, #2.2, and so on. For example, the sequences $C_{3,1}$, $C_{3,4}$ and $C_{3,7}$ of the groups $G_1$, $G_4$ and $G_7$ are assigned to the sectors #1.1 to #1.3 of the cell #1 respectively, and cyclic shifted sequences (here, $S_{1-6}$, that is, $S_1$ to $S_6$) based on the assigned sequence can be used in each sector. As described already, with respect to the PUSCH/PUCCH demodulation reference signal, 9-cell repetition assignment is employed by which the sequences $C_{1,1}$ to $C_{1,9}$ are assigned to cells, and with respect to the sounding reference signal, 27-sector repetition assignment is employed by which the sequences $C_{3,1}$ to $C_{3,27}$ are assigned to sectors. Accordingly, the level of interference of every type of reference signal is equivalent to the level of interference in the case of 9-cell repetition.

Note that FIG. 9 is a table as an example showing the exemplary uses of CAZAC sequences and cyclic shifted sequences to be used in individual cells in actuality in a case where the PUSCH/PUCCH demodulation reference signal has a sequence length of 12 and the sounding reference signal has a sequence length of 36. That is, shown here is an example where the sequence length of each type of reference signal is the smallest, and accordingly the reuse distance is also short.

As described above, even in the case where the sequence length of each type of reference signal is the smallest, the PUSCH demodulation reference signal sequences are repeatedly used every nine cells, the PUCCH demodulation reference signal sequences are repeatedly used every nine cells, and the sounding reference signal sequences are repeatedly used every 27 sectors. Accordingly, the level of interference of every type of reference signal can be set as low as the level of interference in the case of 9-cell repetition.

1.7) Effects

According to the present exemplary embodiment described above, with consideration given to the features and required conditions (at least the minimum sequence length and the number of multiplexed UEs) of each type of reference signal, cell repetition assignment is employed with respect to the PUSCH demodulation reference signal and PUCCH demodulation reference signal, and sector repetition assignment is employed with respect to the sounding reference signal, whereby sequence assignment placing higher priority on the reuse distance is performed so that the reuse distance is made large. Accordingly, it can be hoped that an effect is obtained in a case where the number of reference signal sequences is small, or in an environment where the influence of inter-cell interference is large. In other words, the influence of inter-cell interference can be reduced, and at the same time, a large number of cyclic shifted sequences per sector can be secured. Moreover, as shown in FIG. 7 as an example, since it is also possible to equalize the reuse distances for the reference signals of all types, a cell design can be simplified. In addition, sequences can be notified without increasing an overhead by making correspondences among each type of reference signal sequence group.

2. Second Exemplary Embodiment

According to the above-described first exemplary embodiment, cell repetition assignment is employed for group assignment with respect to the PUSCH/PUCCH demodulation reference signal, and sector repetition assignment is employed for group assignment with respect to the sounding reference signal. However, the present invention is not limited to this embodiment.

According to a second exemplary embodiment of the present invention, in a case where the sounding reference signal has a sequence length of 36, cell repetition assignment is also employed for group assignment with respect to the sounding reference signal, and three reference signal sequences included in each group are assigned to three sectors respectively. With respect to the PUSCH/PUCCH demodulation reference signal, sequence assignment is performed as in the first exemplary embodiment, and therefore description thereof will be omitted. Hereinafter, description will be given only of sequence assignment with respect to the sounding reference signal.

Figure 10B:
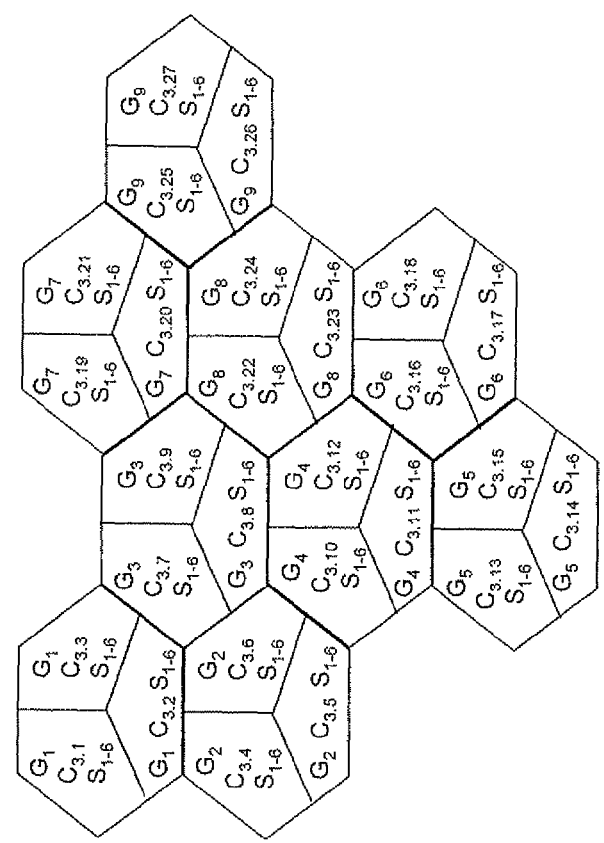
FIG. 10B is a cell structure diagram showing an example of cell repetition assignment of sounding reference signal sequence groups according to the present exemplary embodiment.
Figure 10A:
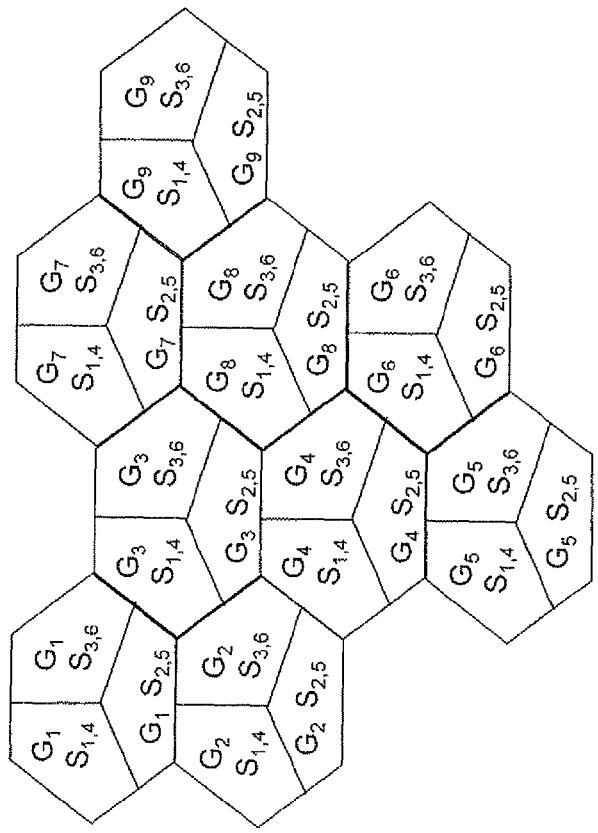
FIG. 10A is a cell structure diagram showing an example of cell repetition assignment of PUSCH/PUCCH demodulation reference signal sequence groups according to a second exemplary embodiment of the present invention.

FIG. 10A is a cell structure diagram showing an example of cell repetition assignment of PUSCH/PUCCH demodulation reference signal sequence groups according to the second exemplary embodiment of the present invention. FIG. 10B is a cell structure diagram showing an example of cell repetition assignment of sounding reference signal sequence groups according to the present exemplary embodiment.

Referring to FIG. 10B, for group assignment with respect to the sounding reference signal, although cell repetition assignment, which is the same as the assignment method shown in FIG. 10A, is employed, three CAZAC sequences of each group in the case of "3 resource blocks" (see FIG. 6) are assigned to three sectors in each cell respectively. Thereby, cyclic shifted sequences $S_1$ to $S_6$ based on the assigned CAZAC sequence can be used in each sector.

FIG. 11 is a sequence assignment table showing, on a cell/sector basis, the assignment of reference signal sequences according to the second exemplary embodiment of the present invention. Here, shown are the exemplary uses of the reference signal sequence groups $G_1$ to $G_9$ and cyclic shifted sequences $S_1$ to $S_6$ as shown in FIGS. 10A and 10B, showing which groups and cyclic shifted sequences are used in each cell and sector.

For example, referring to the cell #1, with respect to the PUSCH demodulation reference signal sequence, the group $G_1$ is assigned to the cell #1, and six cyclic shifted sequences $S_1$ to $S_6$ are assigned to the sectors #1.1 to #1.3 by twos (here, $S_{1,4}$, $S_{2,5}$ and $S_{3,6}$ respectively). Assignment is similarly performed with respect to the PUCCH demodulation reference signal sequence. With respect to the sounding reference signal sequence, although the same group $G_1$ is also assigned to the cell #1, a different point is that the reference signal sequences $C_{3.1}$, $C_{3.2}$ and $C_{3.3}$, which are the items in the row "$G_1$" and the column "3 RESOURCE BLOCKS" of the table of FIG. 6, are assigned to the sectors #1.1 to #1.3 respectively. Accordingly, cyclic shifted sequences $S_1$ to $S_6$ of the assigned one of the reference signal sequences $C_{3.1}$, $C_{3.2}$ and $C_{3.3}$ can be used in each sector. Assignment is similarly performed for each of the other cells #2 to #9, as shown in FIG. 11.

Additionally, since an uplink reference signal is used for channel estimation or for channel quality measurement, it is necessary that an assigned reference signal sequence should be known to both of a base station and a mobile station in advance. To this end, the base station notifies each mobile station of a reference signal sequence to use. According to the present exemplary embodiment, as in the first exemplary embodiment, the base station notifies each mobile station of a sequence notification number shown in the bottom row of the table of FIG. 11. If a base station and a mobile station share a sequence assignment table as shown in FIG. 11 in advance, the mobile station can identify reference signal sequence groups and cyclic shifted sequences under the groups by the base station notifying a sequence notification number.

According to the second exemplary embodiment of the present invention, with consideration given to at least the minimum sequence length and the number of multiplexed UEs, cell repetition assignment is employed also for group assignment with respect to the sounding reference signal. Specifically, if the sequence length of the sounding reference signal is 36 or greater, cell repetition assignment is employed also for group assignment with respect to the sounding reference signal, and three different reference signal sequences (pseudo-orthogonal sequences) or more included in each group are respectively assigned to a plurality of sectors in each cell. Thereby, in each cell, the same group can be assigned with respect to all of the PUSCH demodulation reference signal, PUCCH demodulation reference signal, and sounding reference signal. Accordingly, in addition to an effect similar to that of the first exemplary embodiment, a further advantage is offered that sequence assignment control can be facilitated.

3. Third Exemplary Embodiment

According to the above-described first and second exemplary embodiments, the assignment method placing higher priority on the reuse distance is employed with respect to the PUCCH demodulation reference signal. However, the present invention is not limited to these embodiments.

According to a third exemplary embodiment of the present invention, an assignment method placing higher priority on the number of multiplexed UEs is employed with respect to the PUCCH demodulation reference signal. That is, in the third exemplary embodiment, cell repetition assignment is employed with respect to the PUSCH demodulation reference signal as in the first and second exemplary embodiments, but sector repetition assignment is employed with respect to the PUCCH demodulation reference signal and sounding reference signal.

FIG. 12A is a cell structure diagram showing an example of a method for cell repetition assignment of sequence groups with respect to the PUSCH demodulation reference signal according to the third exemplary embodiment of the present invention. FIG. 12B is a cell structure diagram showing an example of a method for sector repetition assignment of sequence groups with respect to the PUCCH demodulation reference signal according to the present exemplary embodiment. FIG. 12C is a cell structure diagram showing an example of a method for sector repetition assignment of sequence groups with respect to the sounding reference signal. Since the different point from the above-described first and second exemplary embodiments is the sequence assignment with respect to the PUCCH demodulation reference signal shown in FIG. 12B, description will be given below of the assignment method shown in FIG. 12B.

3.1) Sequence Assignment for PUCCH DM RS

For sequence group assignment with respect to the PUCCH demodulation reference signal, sector repetition assignment is employed so that a large number of cyclic shifted sequences can be used (that is, a large number of UEs can be multiplexed) in each cell. In this case, cyclic shifted sequences based on each CAZAC sequence are used only to orthogonalize reference signals of UEs that are transmitting PUCCH.

Referring to FIG. 12B, sector repetition assignment is employed for group assignment with respect to the PUCCH demodulation reference signal. That is, the nine groups $G_1$ to $G_9$ are sequentially assigned to the different sectors #1.1, #1.2, #1.3, #2.1, #2.2, and so on. Here, the groups are assigned to the sectors through sector repetition assignment in such a manner that the groups $G_1$, $G_4$ and $G_7$ are assigned to the sectors #1.1 to #1.3 in the cell #1 respectively, the groups $G_2$, $G_5$ and $G_8$ are assigned to the sectors #2.1 to #2.3 in the cell #2 respectively, and so on. Note that this order in which the groups are assigned is an example. For example, it is also possible that the groups $G_1$ to $G_3$ are assigned to the sectors #1.1 to #1.3 in the cell #1 respectively.

By assigning the groups in this manner, a maximum number of cyclic shifted sequences (here, $S_{1-6}$, that is, $S_1$ to $S_6$) based on a reference signal sequence of the assigned group can be used in each sector. Accordingly, in the case where the PUCCH demodulation reference signal corresponds to three resource blocks, the number of CDM-UEs can be increased to 18 (6×3) at the largest by applying block spreading (Walsh covering) as described already. These cyclic shifted sequences can be used only to orthogonalize reference signals of users that are transmitting PUCCH.

3.2) Sequence Assignment Table

According to the present exemplary embodiment, with consideration given to the above-described features and required conditions of each type of reference signal, cell repetition assignment is employed with respect to the PUSCH demodulation reference signal, and sector repetition assignment is employed with respect to the PUCCH demodulation reference signal and sounding reference signal, as shown in FIGS. 12A to 12C. From the standpoint of each cell and sector, the assignment methods can be described as follows.

FIG. 13 is a sequence assignment table showing, on a cell/sector basis, the assignment of reference signal sequences according to the third exemplary embodiment of the present invention. Here, shown are the exemplary uses of the CAZAC sequence groups $G_1$ to $G_9$ and cyclic shifted sequences $S_1$ to $S_6$ as shown in FIGS. 12A to 12C, showing which groups and cyclic shifted sequences are used in each cell and sector.

For example, referring to the cell #1, with respect to the PUSCH demodulation reference signal sequence, the group $G_1$ is assigned to the cell #1, and six cyclic shifted sequences $S_1$ to $S_6$ are assigned to the sectors #1.1 to #1.3 by twos (here, $S_{1,4}$, $S_{2,5}$ and $S_{3,6}$ respectively).

On the other hand, with respect to the PUCCH demodulation reference signal sequence and sounding reference signal sequence, the nine groups $G_1$ to $G_9$ are sequentially assigned to the different sectors #1.1, #1.2, #1.3, #2.1, #2.2, and so on. For example, the groups $G_1$, $G_4$ and $G_7$ are assigned to the sectors #1.1 to #1.3 of the cell #1 respectively, and cyclic shifted sequences (here, $S_{1-6}$, that is, $S_1$ to $S_6$) based on a reference signal sequence belonging to the assigned one of the groups $G_1$, $G_4$ and $C_7$ can be used in each sector.

Incidentally, in a case where the PUSCH/PUCCH demodulation reference signal corresponds to one is resource block and the sounding reference signal corresponds to three resource blocks, even if the same groups are assigned, the PUCCH demodulation reference signal sequences are nine sequences $C_{1.1}$ to $C_{1.9}$, and the sounding reference signal sequences are 27 sequences $C_{3.1}$ to $C_{3.27}$, as described with reference to FIG. 6. Accordingly, with respect to the PUCCH demodulation reference signal, 9-sector repetition assignment is employed by which the reference signal sequences $C_{1.1}$ to $C_{1.9}$ of the groups $G_1$ to $G_9$ are sequentially assigned to the sectors #1.1 to #9.3, and the level of interference of this type of reference signal is equivalent to the level of interference in the case of 3-cell repetition.

That is, the PUSCH demodulation reference signal sequences are repeatedly used every nine cells, the PUCCH demodulation reference signal sequences are repeatedly used every nine sectors, and the sounding reference signal sequences are repeatedly used every 27 sectors. The levels of inter-cell interference of the PUSCH demodulation reference signal, PUCCH demodulation reference signal, and sounding reference signal are equivalent to those in the cases of 9-cell repetition, 3-cell repetition, and 9-cell repetition respectively.

Moreover, two cyclic shifted sequences per sector can be used for the PUSCH demodulation reference signal, six cyclic shifted sequences per sector can be used for the PUCCH demodulation reference signal, and six cyclic shifted sequences per sector can be used for the sounding reference signal. Note that the cyclic shifted sequences for PUSCH demodulation are used only when MIMO is applied, and the cyclic shifted sequences for PUCCH demodulation and the cyclic shifted sequences for sounding are used for UE multiplexing.

3.3) Notification of Sequence Assignment

Since an uplink reference signal is used for channel estimation or for channel quality measurement, it is necessary that an assigned reference signal sequence should be known to both of a base station and a mobile station in advance. To this end, the base station notifies each mobile station of a reference signal sequence to use.

According to the present exemplary embodiment, the base station does not notify each one of reference signal sequence groups to use but notifies a sequence notification number shown in the bottom row of the table of FIG. 13 to each mobile station. If a base station and a mobile station share a sequence assignment table as shown in FIG. 13 in advance, the mobile station can identify reference signal sequence groups and cyclic shifted sequences under the groups by the base station notifying a sequence notification number. For example, when receiving a sequence notification number "1," the mobile station knows that cyclic shifted sequences $S_1$ and $S_4$ under the CAZAC sequence group $G_1$ can be used for the PUSCH demodulation reference signal, and that cyclic shifted sequences $S_1$ to $S_6$ under the group $G_1$ can be used for the PUCCH demodulation reference signal and sounding reference signal.

With correspondences thus made among each type of reference signal sequence group, three types of reference signal sequence groups are collectively notified at a time, whereby required information about sequence assignment can be notified using a small overhead.

Incidentally, cell/sector-specific information, which includes information about a CAZAC sequence group and cyclic shifted sequences with respect to the PUSCH demodulation reference signal, a CAZAC sequence group and cyclic shifted sequences with respect to the PUCCH demodulation reference signal, and a CAZAC sequence group with respect to the sounding reference signal, is transmitted through BCH or the like, which is a common channel among cells. Moreover, user-specific information, which includes information about a cyclic shifted sequence for the PUCCH demodulation reference signal and a cyclic shifted sequence for the sounding reference signal, is transmitted through PDCCH or the like, which mainly transmits a downlink control signal. For example, when a PUCCH demodulation reference signal and a sounding reference signal are multiplexed by CDM, cyclic shifted sequences specific to a user are required as information specific to the user.

3.4) Specific Example

Next, a specific example of the reference signal sequence assignment method according to the present exemplary embodiment shown in FIGS. 12A to 13 will be presented.

Figure 14B:
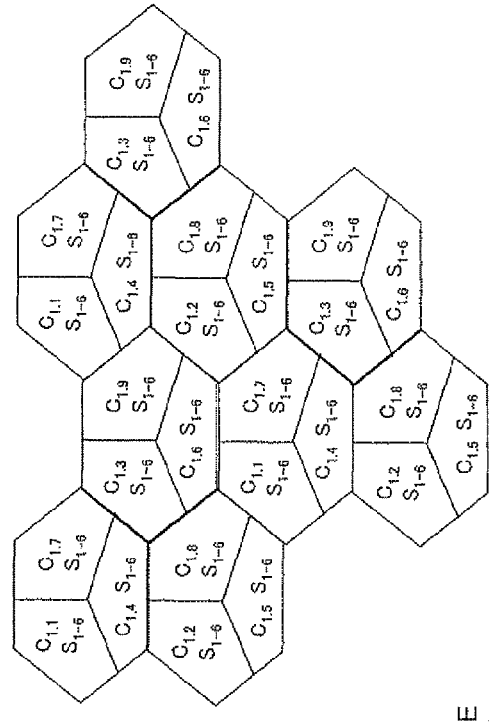
FIG. 14B is a cell structure diagram showing an example of sector repetition assignment of PUCCH demodulation reference signal sequences and cyclic shifted sequences under similar conditions.
Figure 14C:
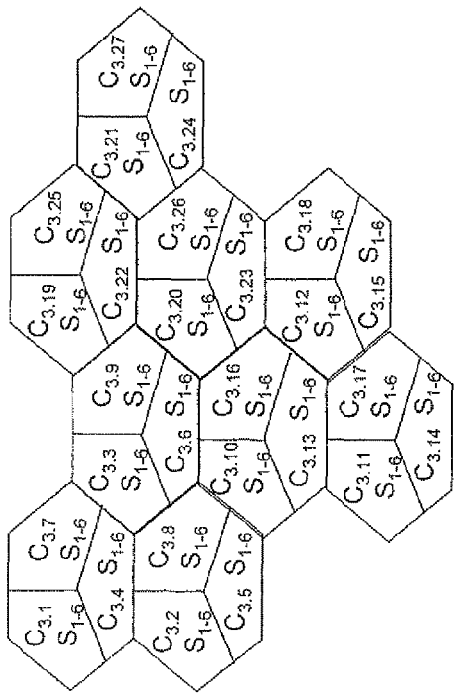
FIG. 14C is a cell structure diagram showing an example of sector repetition assignment of sounding reference signal sequences under similar conditions.
Figure 14A:
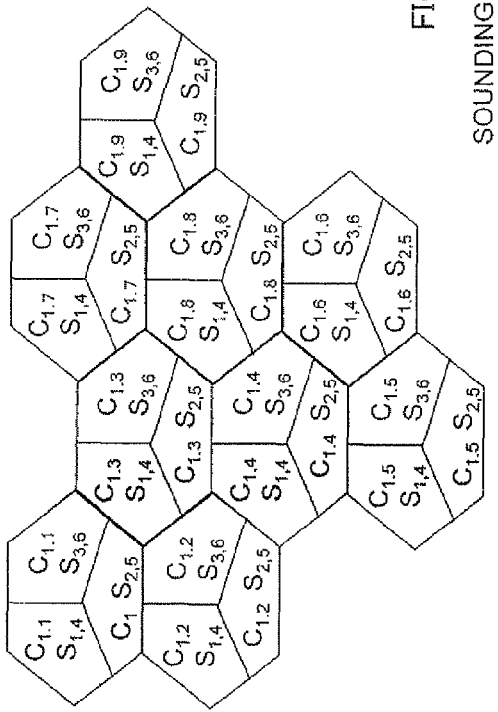
FIG. 14A is a cell structure diagram showing an example of cell repetition assignment of PUSCH demodulation reference signal sequences and cyclic shifted sequences to be used in individual cells in a case where the PUSCH/PUCCH demodulation reference signal has a sequence length of 12 and the sounding reference signal has a sequence length of 36.

FIG. 14A is a cell structure diagram showing an example of cell repetition assignment of PUSCH demodulation reference signal sequences and their cyclic shifted sequences to be used in individual cells in a case where the PUSCH/PUCCH demodulation reference signal has a sequence length of 12 and the sounding reference signal has a sequence length of 36. FIG. 14B is a cell structure diagram showing an example of sector repetition assignment of PUCCH demodulation reference signal sequences and their cyclic shifted sequences under similar conditions. FIG. 14C is a cell structure diagram showing an example of sector repetition assignment of sounding reference signal sequences under similar conditions.

Note that the cell and sector structures are similar to those shown in FIGS. 12A to 12C, and FIGS. 14A and 14C are the same as FIGS. 8A and 8B respectively. Therefore, description thereof will be omitted. For the PUSCH demodulation reference signal and PUCCH demodulation reference signal, since their sequence lengths are both 12, the CAZAC sequences $C_{1.1}$ to $C_{1.9}$, which are shown in the column "1 RESOURCE BLOCK" of the table of FIG. 6, are used. For the sounding reference signal, since its sequence length is 36, the CAZAC sequences $C_{3.1}$ to $C_{3.27}$, which are shown in the column "3 RESOURCE BLOCKS" of the table of FIG. 6, are used.

Referring to FIG. 14B, the CAZAC sequences $C_{1.1}$ to $C_{1.9}$ of the groups $G_1$ to $G_9$ are assigned to sectors through 9-sector repetition assignment. For example, the sequences $C_{1.1}$, $C_{1.4}$ and $C_{1.7}$ are assigned to the sectors #1.1 to #1.3 in the cell #1 respectively, and cyclic shifted sequences $S_1$ to $S_6$ based on the assigned CAZAC sequence can be used in each sector.

FIG. 15 is a sequence assignment table showing, on a cell/sector basis, the assignment of the reference signal sequences shown in FIGS. 14A to 14C. Here, shown are the exemplary uses of the CAZAC sequences $C_{1.1}$ to $C_{1.9}$ and $C_{3.1}$ to $C_{3.27}$ and their cyclic shifted sequences $S_1$ to $S_6$, showing which CAZAC sequences and cyclic shifted sequences are used in each cell and sector.

For example, referring to the cell #1, with respect to the PUSCH demodulation reference signal sequence, the sequence $C_{1.1}$ of the group $G_1$ is assigned to the cell #1, and six cyclic shifted sequences $S_1$ to $S_6$ based on the sequence $C_{1.1}$ are assigned to the sectors #1.1 to #1.3 by twos (here, $S_{1,4}$, $1_{2,5}$ and $S_{3,6}$ respectively).

With respect to the PUCCH demodulation reference signal sequence, the sequences $C_{1.1}$ to $C_{1.9}$ of the nine groups $G_1$ to $G_9$ are sequentially assigned to the different sectors #1.1, #1.2, #1.3, #2.1, #2.2, and so on. For example, the sequences $C_{1.1}$, $C_{1.4}$ and $C_{1.7}$ of the groups $G_1$, $G_4$ and $G_7$ are assigned to the sectors #1.1 to #1.3 of the cell #1 respectively, and cyclic shifted sequences (here, $S_{1-6}$, that is, $S_1$ to $S_6$) based on the assigned sequence can be used in each sector.

Moreover, with respect to the sounding reference signal, the sequences $C_{3.1}$ to $C_{3.27}$ of the nine groups $G_1$ to $G_9$ are sequentially assigned to the different sectors #1.1, #1.2, #1.3, #2.1, #2.2, and so on. For example, the sequences $C_{3.1}$, $C_{3.4}$ and $C_{3.7}$ of the groups $G_1$, $G_4$ and $G_7$ are assigned to the sectors #1.1 to #1.3 of the cell #1 respectively, and cyclic shifted sequences (here, $S_{1-6}$, that is, $S_1$ to $S_6$) based on the assigned sequence can be used in each sector.

Note that FIG. 15 is a table as an example showing the exemplary uses of the CAZAC sequences and cyclic shifted sequences to be used in each cell in actuality in a case where the PUSCH/PUCCH demodulation reference signal has a sequence length of 12 and the sounding reference signal has a sequence length of 36. That is, shown here is an example where the sequence length of each type of reference signal is the smallest. In the present exemplary embodiment, the PUSCH demodulation reference signal sequences are repeatedly used every nine cells, the PUCCH demodulation reference signal sequences are repeatedly used every nine sectors, and the sounding reference signal sequences are repeatedly used every 27 sectors. The levels of interference of the PUSCH demodulation reference signal, PUCCH demodulation reference signal, and sounding reference signal are equivalent to those in the cases of 9-cell repetition, 3-cell repetition, and 9-cell repetition respectively.

3.5) Effects

According to the present exemplary embodiment described above, with consideration given to the features and required conditions (at least the minimum sequence length and the number of multiplexed UEs) of each type of reference signal, cell repetition assignment is employed with respect to the PUSCH demodulation reference signal, and sector repetition assignment is employed with respect to the PUSCH demodulation reference signal and sounding reference signal, whereby sequence assignment placing higher priority on the number of multiplexed UEs of PUCCH than on the reuse distance is performed. Accordingly, since the reuse distance at which the CAZAC signal sequences for PUCCH demodulation are repeatedly used is smaller than those in the first and second exemplary embodiments, it can be hoped that an effect is obtained in a case where the number of the CAZAC signal sequences for PUCCH demodulation is relatively large, or in an environment where the influence of inter-cell interference is small.

4. Mobile Communications System 4.1) Base Station

A base station in a mobile communications system according to the present invention transmits a sequence notification number to each mobile station, thereby notifying CAZAC sequences for uplink reference signals, as described through the first to third exemplary embodiments. Hereinafter, the configuration and operations of the base station will be described briefly.

Figure 16:
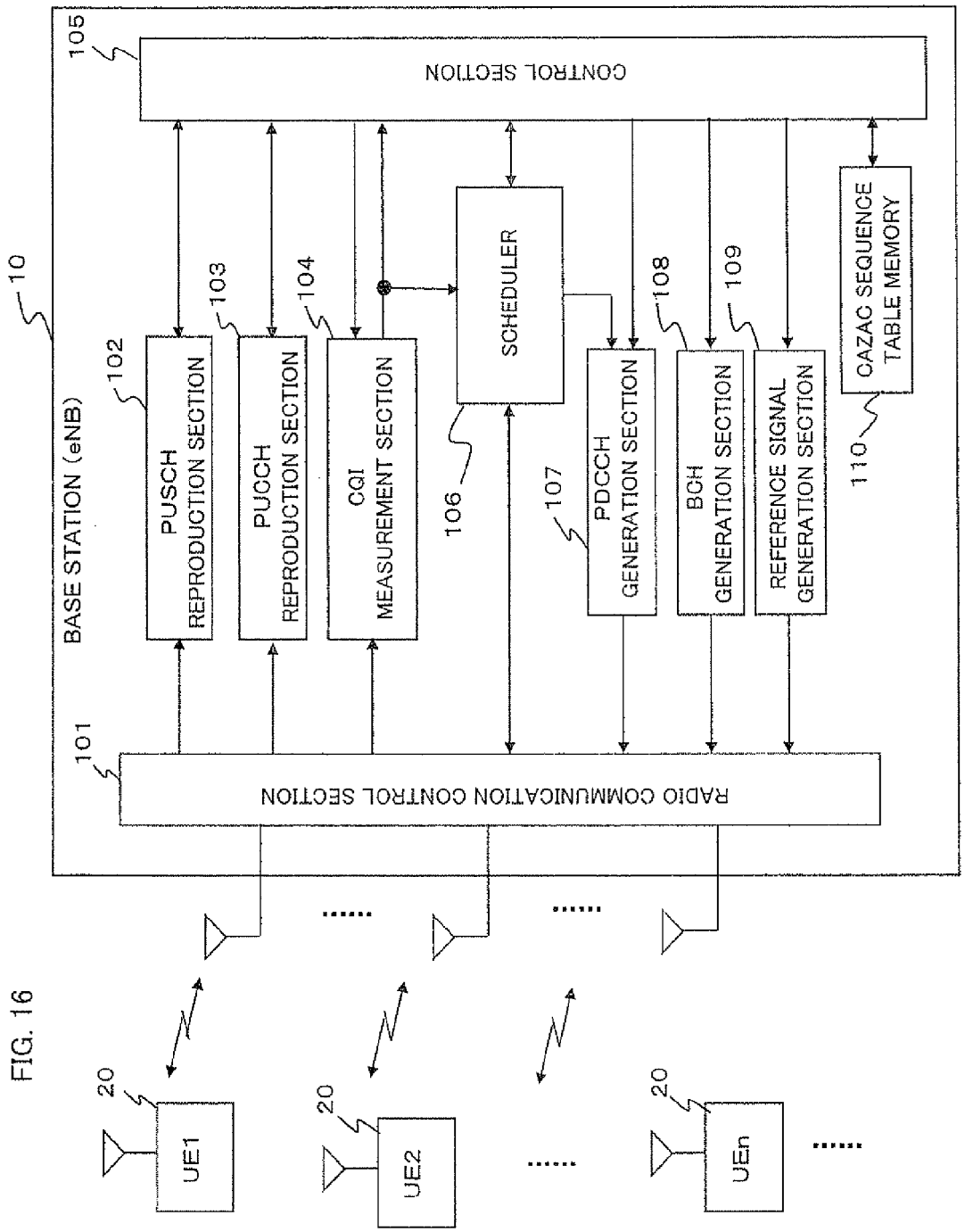
FIG. 16 is a block diagram showing the major configuration of a base station in a mobile communications system to which the sequence assignment method according to any one of the first to third exemplary embodiments of the present invention is applied.

FIG. 16 is a block diagram showing the major configuration of a base station in a mobile communications system to which the sequence assignment method according to any one of the first to third exemplary embodiments of the present invention is applied. Here, it is assumed that the base station 10 accommodates a plurality of mobile stations 20 (UE1, UE2, and so on).

Figure 1:
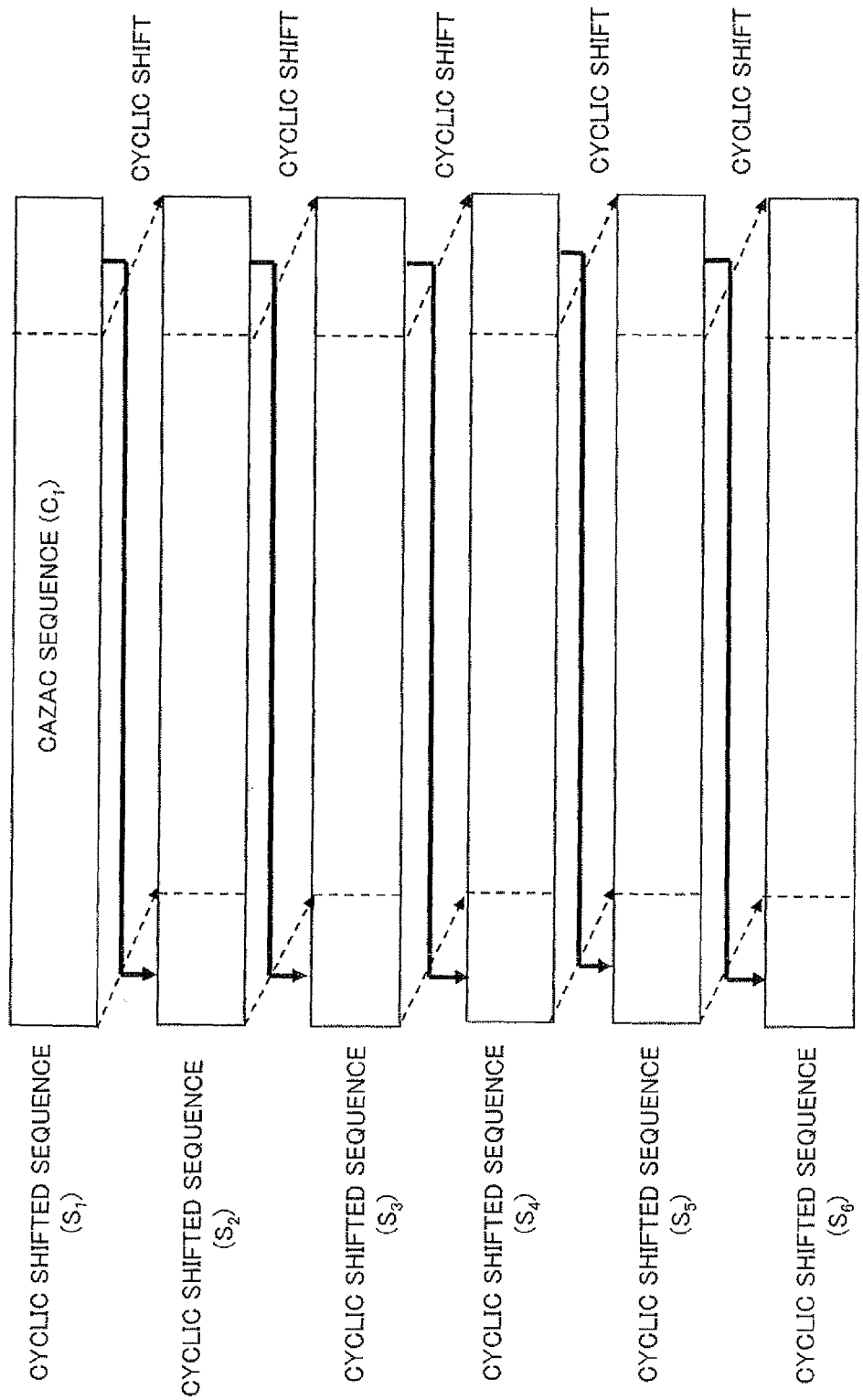
FIG. 1 is a schematic diagram to describe cyclic shift based on a CAZAC sequence.
Figure 2:
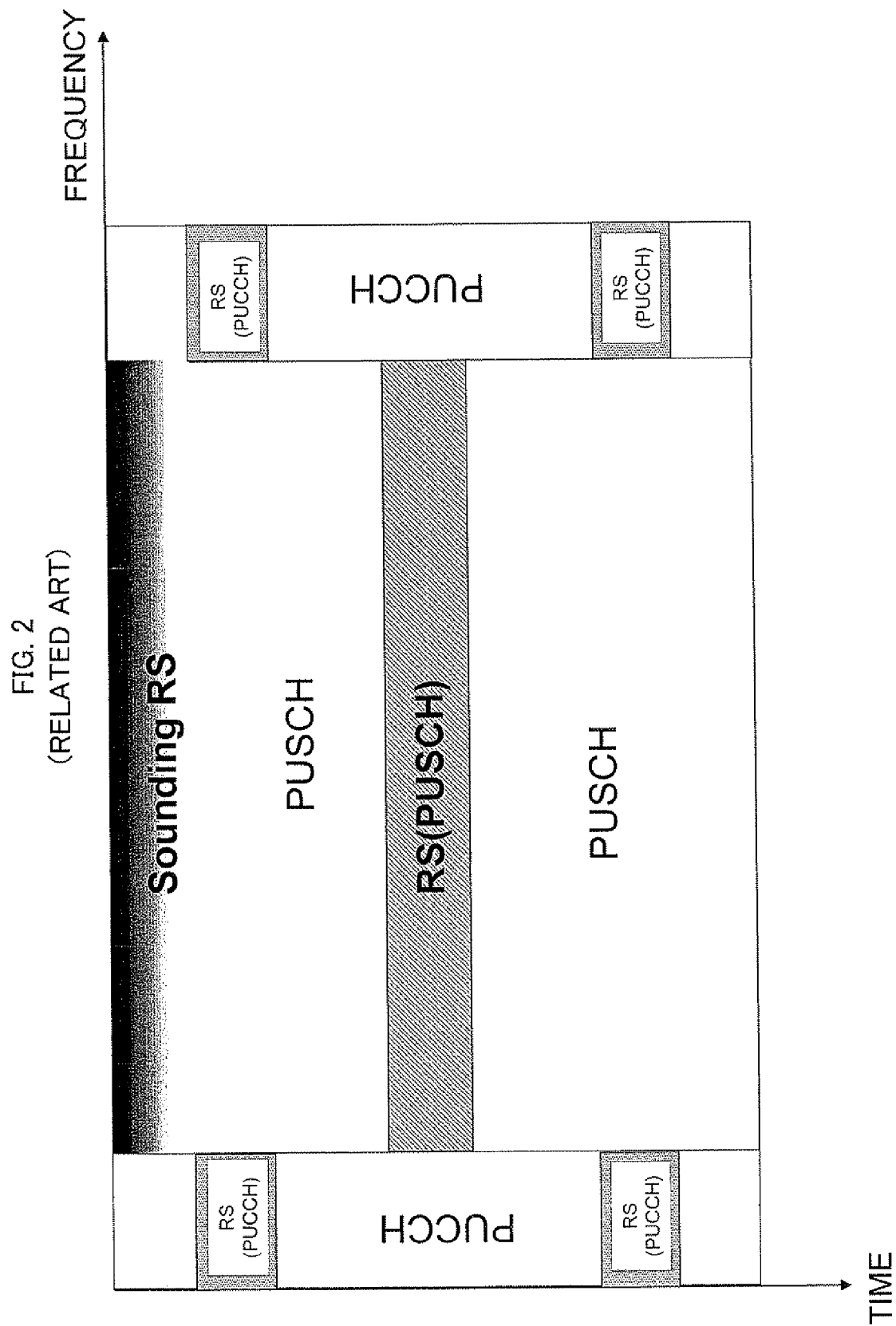
FIG. 2 is a format diagram showing an example of resource allocation in a slot including PUSCH, PUCCH, reference signals for modulation of these channels, and a sounding reference signal.
Figure 3:
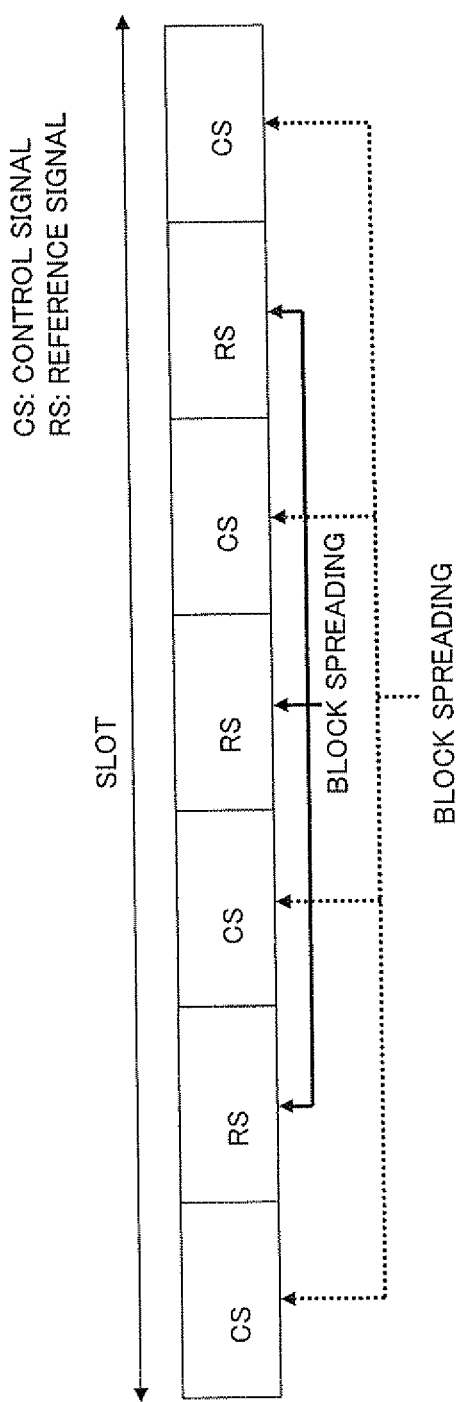
FIG. 3 is a format diagram showing an example of the structure of a PUCCH slot.

A radio communication control section 101 controls communicating with the plurality of mobile stations 20 in accordance with a predetermined frequency-time multiplex structure as shown in FIG. 2 for example. For example, the radio communication control section 101 demultiplexes multiplexed signals received from the plurality of mobile stations 20 and outputs the demultiplexed signals to a PUSCH reproduction section 102, PUCCH reproduction section 103, and CQI measurement section 104. The radio communication control section 101 also multiplexes various types of transmission signals from a PDCCH generation section 107, BCH generation section 108, and reference signal generation section 109 in accordance with the predetermined frequency-time multiplex structure and transmits the multiplexed signals to the plurality of mobile stations 20.

The CQI measurement section 104 receives a sounding reference signal from each mobile station 20, thereby measuring uplink channel quality. The CQI measurement section 104 outputs the measured uplink channel quality to each of a control section 105 and a scheduler 106. The scheduler 106, under the control of the control section 105, performs channel-dependent frequency scheduling by using the measured uplink channel quality of each mobile station 20.

The scheduler 106 outputs to the PDCCH generation section 107 information about a cyclic shifted sequence for the PUCCH demodulation reference signal and a cyclic shifted sequence for the sounding reference signal, which is user-specific information. The information is transmitted to each mobile station 20 as a downlink control signal through the PDCCH generation section 107 and radio communication control section 101.

The control section 105 outputs to the BCH generation section 108 information about a CAZAC sequence group and cyclic shifted sequences with respect to the PUSCH demodulation reference signal, a CAZAC sequence group and cyclic shifted sequences with respect to the PUCCH demodulation reference signal, and CAZAC sequences for the sounding reference signal, which is cell/sector-specific information. This information is broadcast through the BCH generation section 108 and radio communication control section 101.

Moreover, the control section 105 selects a sequence to use by referring to sequence groups and a sequence assignment table stored in a CAZAC sequence table memory 110. The sequence assignment table is any one of the tables shown as examples in FIGS. 7, 9, 11, 13, and 15. The sequence groups are those shown in FIG. 6 as an example. Note that the sequence assignment table stored in the CAZAC sequence table memory 110 may be set at the time of shipment from a factory, or may be set or updated at the time of, or after, installation.

According to the first exemplary embodiment, the control section 105, considering the features and required conditions (at least the minimum sequence length and the number of multiplexed UEs) of each type of reference signal, controls the scheduler 106 in accordance with the reference assignment table so that cell repetition assignment of sequences will be selected with respect to the PUSCH demodulation reference signal and PUCCH demodulation reference signal, and so that sector repetition assignment of sequences will be selected with respect to the sounding reference signal. Thereby, the reuse distance, at which the same reference signal sequences (pseudo-orthogonal sequences) are repeatedly used, can be made large (reuse distance priority).

According to the second exemplary embodiment, the control section 105, considering at least the minimum sequence length and the number of multiplexed UEs, controls the scheduler 106 so that cell repetition assignment will be selected also for group assignment with respect to the sounding reference signal if the sounding reference signal has a sequence length of 36 or greater. In this case, three different reference signal sequences (pseudo-orthogonal sequences) or more included in each group are respectively assigned to a plurality of sectors in each cell.

According to the third exemplary embodiment, the control section 105, considering at least the minimum sequence length and the number of multiplexed users, controls the scheduler 106 so that cell repetition assignment of sequences will be selected with respect to the PUSCH demodulation reference signal, and so that sector repetition assignment of sequences will be selected with respect to the PUCCH demodulation reference signal and sounding reference signal. Thereby, sequence assignment placing higher priority on the number of multiplexed UEs of PUCCH than on the reuse distance is performed.

In addition, the sequence assignment table is stored in the CAZAC sequence table memory 110 whereby the base station can designate reference signal sequence groups to each mobile station 20 only by notifying a sequence notification number, without an overhead being increased.

Incidentally, the control section 105 and scheduler 106 can also implement each of the above-described exemplary embodiments by executing a program on a program-controlled processor.

4.2) Mobile Station (UE)

Figure 17:
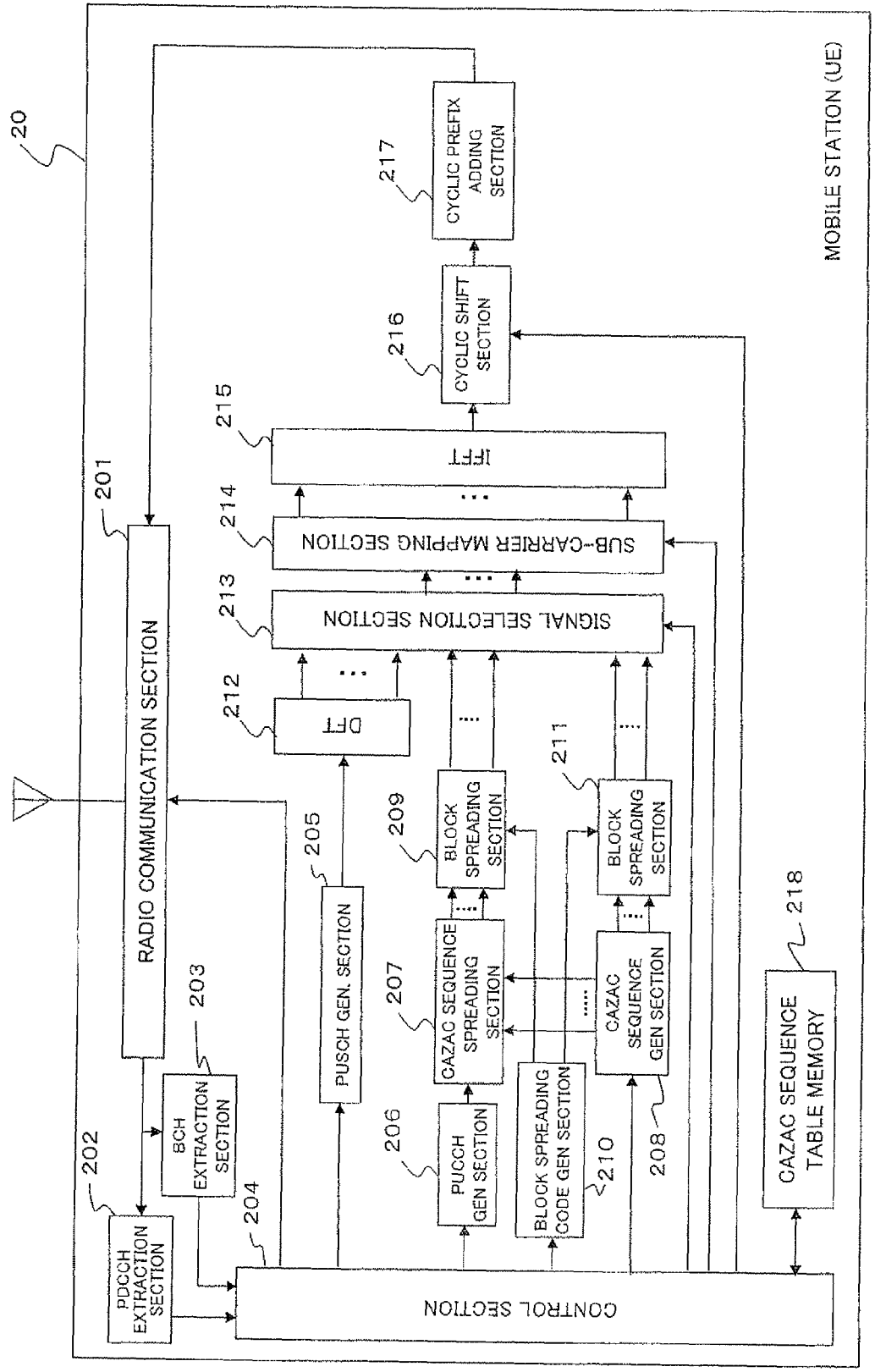
FIG. 17 is a block diagram showing the major configuration of a mobile station in the mobile communications system to which the sequence assignment method according to any one of the first to third exemplary embodiments of the present invention is applied.

FIG. 17 is a block diagram showing the major configuration of a mobile station 20 in the mobile communications system to which the sequence assignment method according to any one of the first to third exemplary embodiments of the present invention is applied. Since resource management is not performed by the mobile station 20, resources to be used for transmission and reception are set in accordance with information about uplink and downlink resource assignment received from the base station 10. As described already, the mobile station 20 sets CAZAC sequences to use and a cyclic shift amount to make in each CAZAC sequence, in accordance with information notified from the base station 10, such as a sequence notification number. Hereinafter, the circuit structure and operations of the mobile station 20 will be described briefly.

Referring to FIG. 17, a radio communication section 201 receives from the base station 10 multiplexed signals, from which information about user-specific reference signal sequences is extracted by a PDCCH extraction section 202, and information about cell/sector-specific reference signal sequences is extracted by a BCH extraction section 203. In accordance with a sequence notification number and cyclic shift information notified from the base station 10, a control section 204 determines a CAZAC sequence and performs cyclic-shifting control and the like.

A PUSCH generation section 205 generates a PUSCH data signal. The PUSCH data signal is transformed into frequency domain by a Discrete Fourier Transform (DFT) section 212 and then output to a signal selection section 213.

A PUCCH generation section 206 generates a PUCCH control signal. A CAZAC sequence spreading section 207 spreads the PUCCH control signal by using a frequency-domain CAZAC sequence input from a CAZAC sequence generation section 208. This CAZAC sequence is a sequence generated by the CAZAC sequence generation section 208 in accordance with the information notified from the base station 10, such as the sequence notification number, and is the same as a PUCCH demodulation reference signal sequence to be used by the mobile station 20.

The CAZAC sequence generation section 208 generates frequency-domain CAZAC sequences and outputs them to the CAZAC sequence spreading section 207 and a block spreading section 211. Another block spreading section 209 performs block spreading on the PUCCH spread control signal by using a spreading code from a block-spreading code generation section 210 and outputs the resultant PUCCH control signal to the signal selection section 213. The block spreading section 211 performs block spreading on the frequency-domain CAZAC sequence input from the CAZAC sequence generation section 208 by using a spreading code from the block-spreading code generation section 210 and outputs the resultant reference signal (CAZAC sequence) to the signal selection section 213. The block-spreading code generation section 210 generates codes used for block spreading of the PUCCH control signal and reference signals.

The signal selection section 213, under the control of the control section 204, sequentially selects the PUSCH data signal from the DFT 212, the PUCCH control signal from the block spreading section 209, and the reference signal from the block spreading section 211, multiplexes the signals by, for example, time division multiplexing in the time direction shown in FIG. 2, and then outputs the multiplexed signals to a sub-carrier mapping section 214. The sub-carrier mapping section 214 maps the frequency-domain signals input from the signal selection section 213 into the sub-carriers of allocated resource blocks and outputs the resultant signals to an inverse Fourier transform (IFFT) section 215, where the signals are transformed into time domain.

Subsequently, cyclic shift section 216, under the control of the control section 204, performs cyclic shifting of the CAZAC sequence. Specifically, for PUSCH, the cyclic shift section 216 does not perform cyclic shifting by setting the cyclic shift amount to zero. For each of PUCCH and the reference signal, the control section 204 designates one of six cyclic shift amounts, based on which cyclic shifting is performed on the time-domain CAZAC signal. Subsequently, a cyclic prefix adding section 217 adds cyclic prefixes to the thus obtained time-domain signals and outputs the resultant signals to the radio communication section 201.

A CAZAC sequence table memory 218 stores sequence groups and a sequence assignment table used for CAZAC sequence assignment control. The control section 204 searches the sequence assignment table by using a sequence notification number notified from the base station 10 and determines CAZAC sequences in accordance with this sequence notification number and cyclic shift information. Based on the determined CAZAC sequences, the CAZAC sequence generation section 208 generates frequency-domain CAZAC sequences. Examples of the sequence assignment table are shown in FIGS. 7, 9, 11, 13, and 15, which are the same as those used by the base station 10. An example of the sequence groups is shown in FIG. 6.

Note that the control section 204 can also implement each of the above-described exemplary embodiments by executing a program on a program-controlled processor.

4.3) Operation

FIG. 18 is a sequence diagram showing a sequence assignment procedure in the mobile communications system to which the sequence assignment method according to any one of the first to third exemplary embodiments of the present invention is applied. Hereinafter, it is assumed that the CAZAC sequence table memory 110 of a base station eNB and the CAZAC sequence table memory 218 of a mobile station UE store the sequence assignment table according to any one of the first to third exemplary embodiments in common.

When the scheduler 106 of the base station eNB has determined CAZAC sequences to use for this mobile station UE, the base station eNB notifies the mobile station UE of a sequence notification number in the sequence assignment table, cyclic shift information, and the like through the PDCCH generation section 107 and BCH generation section 108 (Step S301). Based on the notified sequence notification number and cyclic shift information, the control section 204 of the mobile station UE determines CAZAC sequences for various types of reference signals in the sequence assignment table.

When an uplink data signal from the PUSCH generation section 205 is transmitted, the CAZAC sequence generation section 208 generates a PUSCH demodulation reference signal sequence, and the cyclic shift section 216 performs cyclic shift specific to this mobile station, whereby a PUSCH demodulation reference signal (PUSCH DM RS) is transmitted (Step S303).

When an uplink control signal from the PUCCH generation section 206 is transmitted, the CAZAC sequence generation section 208 generates a PUCCH demodulation reference signal sequence, and the cyclic shift section 216 performs cyclic shift specific to this mobile station UE, whereby a PUCCH demodulation reference signal (PUCCH DM RA) is transmitted (Step S304). In this case, as described already, it is also possible to increase the number of CDM-UEs by applying block spreading.

When a CAZAC sequence of a group corresponding to the sequence notification number, generated by the CAZAC sequence generation section 208, is used as a sounding reference signal sequence, the cyclic shift section 206 performs cyclic shift specific to this mobile station UE, whereby a sounding reference signal is transmitted (Step S305).

Incidentally, when a new sequence notification number is notified (Step S306), the above-described sequence (Steps S301 to S305) is repeated.

5. Other Exemplary Embodiments

In the above-described first to third exemplary embodiments, description has been given of the case where sequences are assigned in group units each of which includes CAZAC sequences of multiple different sequence lengths. However, the present invention can be similarly applied to a case where CAZAC sequences of multiple different sequence lengths, not collected as a group, are individually assigned.

Moreover, in each of the above-described exemplary embodiments, as different types of reference signals, the PUSCH demodulation reference signal, PUCCH demodulation reference signal, and sounding reference signal are used to describe the present invention. However, the present invention is also applicable even if the types of these reference signals are changed. It is possible to reduce the influence of inter-cell interference and also to increase the number of users that can be multiplexed per sector, by applying any of multiple repetition patterns, such as cell repetition and sector repetition, based on at least one of the minimum sequence length of reference signals and the number of multiplexed mobile stations required.

The present invention can be applied to mobile radio cellular systems in general in which assignment of reference signal sequences is performed.

The present invention may be embodied in other specific forms without departing from the spirit or essential features thereof. The above-described exemplary embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A sequence assignment method in a mobile communications system having a plurality of cells, each of which includes a plurality of sectors, comprising:
assigning a plurality of pseudo-orthogonal sequences used for reference signals to cells or sectors using a plurality of repetition patterns, wherein one of the plurality of repetition patterns is used depending on a type of a reference signal.

2. The sequence assignment method according to claim 1, wherein the plurality of repetition patterns includes at least a cell repetition pattern and a sector repetition pattern, wherein according to the cell repetition pattern, a pseudo-orthogonal sequence is reused at intervals of a predetermined number of cells, wherein according to a sector repetition pattern, a pseudo-orthogonal sequence is reused at intervals of a predetermined number of sectors.

3. The sequence assignment method according to claim 2, wherein according to the cell-repetition pattern, orthogonal sequences based on a pseudo-orthogonal sequence assigned to each cell are assigned to a plurality of sectors included in the cell.

4. The sequence assignment method according to claim 2, wherein according to the sector-repetition pattern, each sector has a plurality of orthogonal sequences based on a pseudo-orthogonal sequence assigned to the sector.

5. The sequence assignment method according to claim 1, wherein types of reference signals are classified based on a minimum sequence length of reference signal sequences and a required number of multiplexed mobile stations.

6. The sequence assignment method according to claim 1, wherein one of the plurality of repetition patterns is used is further based on at least one of a minimum sequence length of reference signal sequences and a required number of multiplexed mobile stations.

7. The sequence assignment method according to claim 1, wherein the plurality of pseudo-orthogonal sequences is classified into groups, each of which includes sequences of at least one sequence length, wherein pseudo-orthogonal sequences are reused in units of the groups using the repetition patterns.

8. The sequence assignment method according to claim 1, wherein the reference signals are classified into types of a PUSCH (Physical Uplink Shared Channel) demodulation reference signal, a PUCCH (Physical Uplink Control Channel) demodulation reference signal, and a sounding reference signal.

9. The sequence assignment method according to claim 8, wherein the PUSCH demodulation reference signal is transmitted in a frame including a data channel which is an uplink physical channel for data transmission;
the PUCCH demodulation reference signal is transmitted in a frame including a control channel which is an uplink physical channel for control signal transmission; and
the sounding reference signal is transmitted independently of the data channel and the control channel.

10. The sequence assignment method according to claim 8, wherein the PUSCH demodulation reference signal is used for demodulation of the data channel, the PUCCH demodulation reference signal is used for demodulation of the control channel, and the sounding reference signal is used for measurement of uplink channels.

11. The sequence assignment method according to claim 8, wherein pseudo-orthogonal sequences used for the PUSCH demodulation reference signal are assigned according to a cell-repetition pattern, and pseudo-orthogonal sequences used for the sounding reference signal are assigned according to a sector-repetition pattern.

12. The sequence assignment method according to claim 8, wherein pseudo-orthogonal sequences used for the PUCCH demodulation reference signal are assigned according to either a cell-repetition pattern or a sector-repetition pattern.

13. A sequence assignment device in a mobile communications system having a plurality of cells, each of which includes a plurality of sectors, comprising:
a scheduler for assigning a plurality of pseudo-orthogonal sequences used for reference signals to cells or sectors using a plurality of repetition patterns, wherein the scheduler uses one of the plurality of repetition patterns depending on a type of a reference signal.

14. The sequence assignment device according to claim 13, wherein the plurality of repetition patterns includes at least a cell repetition pattern and a sector repetition pattern, wherein according to the cell repetition pattern, a pseudo-orthogonal sequence is reused at intervals of a predetermined number of cells, wherein according to a sector repetition pattern, a pseudo-orthogonal sequence is reused at intervals of a predetermined number of sectors.

15. The sequence assignment device according to claim 14, wherein according to the cell-repetition pattern, orthogonal sequences based on a pseudo-orthogonal sequence assigned to each cell are assigned to a plurality of sectors included in the cell, wherein according to the sector-repetition pattern, each sector has a plurality of orthogonal sequences based on a pseudo-orthogonal sequence assigned to the sector.

16. The sequence assignment device according to claim 13, wherein types of reference signals are classified based on a minimum sequence length of reference signal sequences and a required number of multiplexed mobile stations.

17. The sequence assignment device according to claim 13, wherein the plurality of pseudo-orthogonal sequences is classified into groups, each of which includes sequences of at least one sequence length, wherein the scheduler reuses pseudo-orthogonal sequences in units of the groups using the repetition patterns.

18. A base station in a mobile communications system having a plurality of cells, each of which includes a plurality of sectors, comprising:
a scheduler for assigning a plurality of pseudo-orthogonal sequences used for reference signals to cells or sectors using a plurality of repetition patterns, wherein the scheduler uses one of the plurality of repetition patterns depending on a type of a reference signal.

19. The base station according to claim 18, wherein the plurality of repetition patterns includes at least a cell repetition pattern and a sector repetition pattern, wherein according to the cell repetition pattern, a pseudo-orthogonal sequence is reused at intervals of a predetermined number of cells, wherein according to a sector repetition pattern, a pseudo-orthogonal sequence is reused at intervals of a predetermined number of sectors.

20. The base station according to claim 19, wherein according to the cell-repetition pattern, orthogonal sequences based on a pseudo-orthogonal sequence assigned to each cell are assigned to a plurality of sectors included in the cell, wherein according to the sector-repetition pattern, each sector has a plurality of orthogonal sequences based on a pseudo-orthogonal sequence assigned to the sector.

21. The base station according to claim 20, further comprising:
a memory for storing the repetition patterns and information on orthogonal sequences assigned to each sector, which are related to each other.

22. The base station according to claim 21, wherein the scheduler determines an orthogonal sequence to use on an uplink reference signal by notifying a mobile station of related information stored in the memory.

23. The base station according to claim 18, wherein types of reference signals are classified based on a minimum sequence length among used reference signal sequences and a required number of multiplexed mobile stations.

24. The base station according to claim 18, wherein the plurality of pseudo-orthogonal sequences is classified into groups, each of which includes sequences of at least one sequence length, wherein the scheduler reuses pseudo-orthogonal sequences in units of the groups using the repetition patterns.

25. A computer readable storage device storing a program, which when executed by a program-controlled processor, instructs the program-controlled processor to function as a sequence assignment device in a mobile communications system having a plurality of cells, each of which includes a plurality of sectors, wherein the program, which when executed by the program-controlled processor, instructs the program-controlled processor to further function as a scheduler for assigning a plurality of pseudo-orthogonal sequences used for reference signals to cells or sectors using a plurality of repetition patterns, wherein one of the plurality of repetition patterns is used depending on a type of a reference signal.

26. A computer readable storage device storing a program, which when executed by a program-controlled processor, instructs the program-controlled processor to function as a base station in a mobile communications system having a plurality of cells, each of which includes a plurality of sectors, wherein the program, which when executed by the program-controlled processor, instructs the program-controlled processor to further function as a scheduler for assigning a plurality of pseudo-orthogonal sequences used for reference signals to cells or sectors using a plurality of repetition patterns, wherein one of the plurality of repetition patterns is used depending on a type of a reference signal.

* * * * *